US011250656B2

(12) United States Patent
Lee et al.

(10) Patent No.: US 11,250,656 B2
(45) Date of Patent: Feb. 15, 2022

(54) ELECTRONIC APPARATUS AND OPERATING METHOD THEREOF

(71) Applicant: Samsung Electronics Co., Ltd, Suwon-si (KR)

(72) Inventors: Hojung Lee, Suwon-si (KR); Yongjoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/280,952

(22) Filed: Feb. 20, 2019

(65) Prior Publication Data

US 2019/0259233 A1 Aug. 22, 2019

(30) Foreign Application Priority Data

Feb. 20, 2018 (KR) ........................ 10-2018-0019764

(51) Int. Cl.
*H04L 9/08* (2006.01)
*E05B 47/00* (2006.01)
*G07C 9/00* (2020.01)

(52) U.S. Cl.
CPC ..... *G07C 9/00817* (2013.01); *G07C 9/00309* (2013.01); *G07C 9/00904* (2013.01); *G07C 2009/00753* (2013.01)

(58) Field of Classification Search
CPC .......... G08C 23/04; G05B 19/00; G07C 9/00; G07C 2009/00412; G07C 2009/00785; G07C 2009/00841; G07C 2009/00865; G07C 2209/62; G07C 9/00111; G07C 9/00142; G07C 9/00158; G07C 9/00174; G07C 9/00182; G07C 9/00309; G07C 9/00563; G07C 9/00571; G07C 9/00817; G07C 2009/00555; G07C 9/253; G07C 9/28; G07C 9/33; G07C 9/37; G07C 2009/00404; G07C 2009/00444; G07C 2009/00349; G07C 2009/00373;
(Continued)

(56) References Cited

U.S. PATENT DOCUMENTS 9,773,364 B2 * 9/2017 Kerning .................. H04W 4/12
9,847,020 B2 * 12/2017 Davis ........................ G07C 9/28
(Continued)

FOREIGN PATENT DOCUMENTS

KR 10-1690010 B1 12/2016
KR 10-1726356 B1 4/2017
(Continued)

OTHER PUBLICATIONS

ISA/KR, "International Search Report and Written Opinion of the International Searching Authority," International Application No. PCT/KR2019/002072, dated May 31, 2019, 8 pages.

*Primary Examiner* — Dionne Pendleton

(57) ABSTRACT

According to various embodiments, an electronic device including a touch screen display may receive first information associated with a first electronic key of a first door lock, display a first graphic user interface (GUI) associated with the first electronic key to indicate an inactive status of the first electronic key on the display, receive first credential information associated with the first electronic key, and after receiving the first credential information, change the first GUI to indicate an active status of the first electronic key.

20 Claims, 21 Drawing Sheets

(58) Field of Classification Search
CPC ........... G07C 2009/00761; G07C 2009/00396; H04B 10/116; H04B 10/2513; H04B 1/385; H04B 2001/3861; H04Q 1/00; H04W 12/06; H04W 12/08; H04W 4/14; H04W 4/90; H04W 12/00504; H04W 4/026; H04W 4/027; H04W 4/12; H04W 4/70; H04W 4/80; H04W 84/12; H04W 4/02; H04W 12/003; H04W 12/00502; H04W 12/00503; H04W 12/02; H04W 12/04; H04W 12/0608; H04W 12/0802; H04W 4/008; H04W 12/068; H04W 12/082; H04W 12/126; H04W 12/65; G06F 1/3287; G06F 21/32; G06F 21/45; G06F 21/35; G06F 2221/2111; G08B 21/22; G08B 25/008; G08B 25/016; G08B 27/006; H04L 63/0861; H04L 63/10; H04L 63/102; H04L 63/0853; H04L 63/107; H04L 63/0876; H04L 63/105; H04L 63/108; H04L 9/3226; H04L 63/083; H04L 63/101; H04M 2203/553; H04M 2250/10; H04M 1/7253; H04M 1/67; H04M 1/72519; H04M 1/72569; H04M 1/72572; H04M 2250/02; H04M 2250/12; G06K 9/00087; B60R 25/24; E05B 35/001; E05B 47/00; E05B 47/0001; E05B 47/0012; E05B 49/002
See application file for complete search history.

(56) References Cited

U.S. PATENT DOCUMENTS

| | | | | |
|---|---|---|---|---|
| 2013/0342314 | A1* | 12/2013 | Chen | G07C 9/00309 340/5.65 |
| 2016/0001781 | A1* | 1/2016 | Fung | B60K 28/02 701/36 |
| 2016/0364135 | A1 | 12/2016 | Park et al. | |
| 2017/0136990 | A1 | 5/2017 | Tercero | |
| 2017/0374074 | A1* | 12/2017 | Stuntebeck | H04L 63/102 |
| 2018/0268633 | A1 | 9/2018 | Kwon et al. | |
| 2018/0363327 | A1* | 12/2018 | Kim | H04L 63/101 |
| 2019/0012860 | A1 | 1/2019 | Lee et al. | |
| 2019/0020483 | A1* | 1/2019 | Meng | H04L 9/0866 |

FOREIGN PATENT DOCUMENTS

| | | | |
|---|---|---|---|
| KR | 10-2017-0078415 | A | 7/2017 |
| KR | 10-2018-0105819 | A | 10/2018 |
| KR | 10-2018-0105841 | A | 10/2018 |
| WO | 2018/124741 | A1 | 7/2018 |

* cited by examiner

ELECTRONIC APPARATUS AND OPERATING METHOD THEREOF

CROSS-REFERENCE TO RELATED APPLICATION

This application is based on and claims priority under 35 U.S.C. § 119 to Korean Patent Application No. 10-2018-0019764 filed on Feb. 20, 2018 in the Korean Intellectual Property Office, the disclosure of which is incorporated by reference herein in its entirety.

BACKGROUND

1. Field

The present disclosure relates generally to an electronic device and its operating method.

2. Description of Related Art

Along with advance in mobile communication technology, an electronic device may perform not only a voice call function but also various data communication functions. The electronic device may provide various services through various applications. The electronic device may provide multimedia services, for example, a music service and a video service, digital broadcasting services, or network-based communication services such as a call, wireless Internet, short message service (SMS), and multimedia messaging service (MMS). The electronic device may evolve from a simple communication medium to a device enabling various functions such as communication, distribution, Internet, or payment and may be used across social, cultural, financial, or distribution industries.

The electronic device may be used, for example, to control a door lock. For example, from the door lock control using a plastic card or a fob, the electronic device now may control the door lock using an electronic key. The electronic device may communicate with the door lock and control the door lock by transmitting the electronic key to the door lock.

However, the electronic key of the electronic device is vulnerable to security issues. The electronic key may be issued easily. For example, the electronic key may be issued to the electronic device according to a user's request and then be used. Similarly, not only the electronic device but also an external electronic device may easily obtain and use the electronic key. Alternatively, an external electronic device may access the electronic device and thus obtain or delete the electronic key.

SUMMARY

According to one aspect of the present disclosure, an electronic device may include a touch screen display, a wireless communication circuit, at least one processor operatively connected to the display and the communication circuit, and a memory operatively connected to the processor.

According to another aspect of the present disclosure, the memory may store instructions which, when executed, cause the processor to receive first information associated with a first electronic key of a first door lock via the communication circuit, to display a first graphic user interface (GUI) associated with the first electronic key to indicate an inactive status of the first electronic key on the display, to receive first credential information associated with the first electronic key via the communication circuit, and after receiving the first credential information, to change the first GUI to indicate an active status of the first electronic key.

According to yet another aspect of the present disclosure, a method for operating an electronic device may include receiving first information associated with a first electronic key of a first door lock, displaying a first GUI associated with the first electronic key to indicate an inactive status of the first electronic key on the display, receiving first credential information associated with the first electronic key, and after receiving the first credential information, changing the first GUI to indicate an active status of the first electronic key.

According to still another aspect of the present disclosure, a non-transitory computer-readable storage medium may store one or more programs to receive first information associated with a first electronic key of a first door lock, to display a first GUI associated with the first electronic key to indicate an inactive status of the first electronic key, to receive first credential information associated with the first electronic key, and after receiving the first credential information, to change the first GUI to indicate an active status of the first electronic key.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will be described herein below with reference to the accompanying drawings. In the following description, well-known functions or constructions are not described in detail since they would obscure the invention in unnecessary detail. Terms described below, which are defined considering functions in the present disclosure, may be different depending on user and operator's intention or practice. Therefore, the terms should be defined on the basis of the disclosure throughout this specification.

Figure 1:
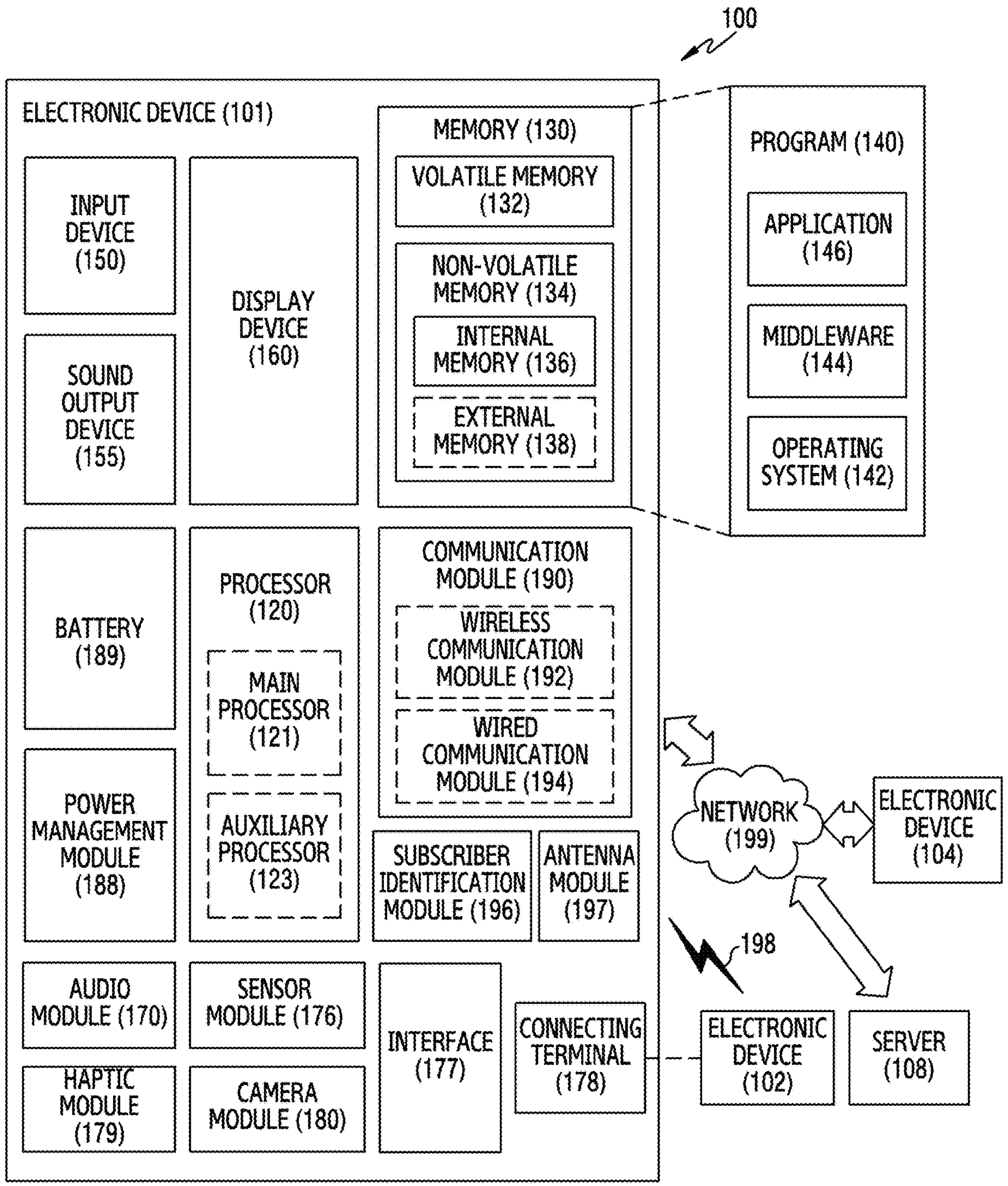
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150 or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wired), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
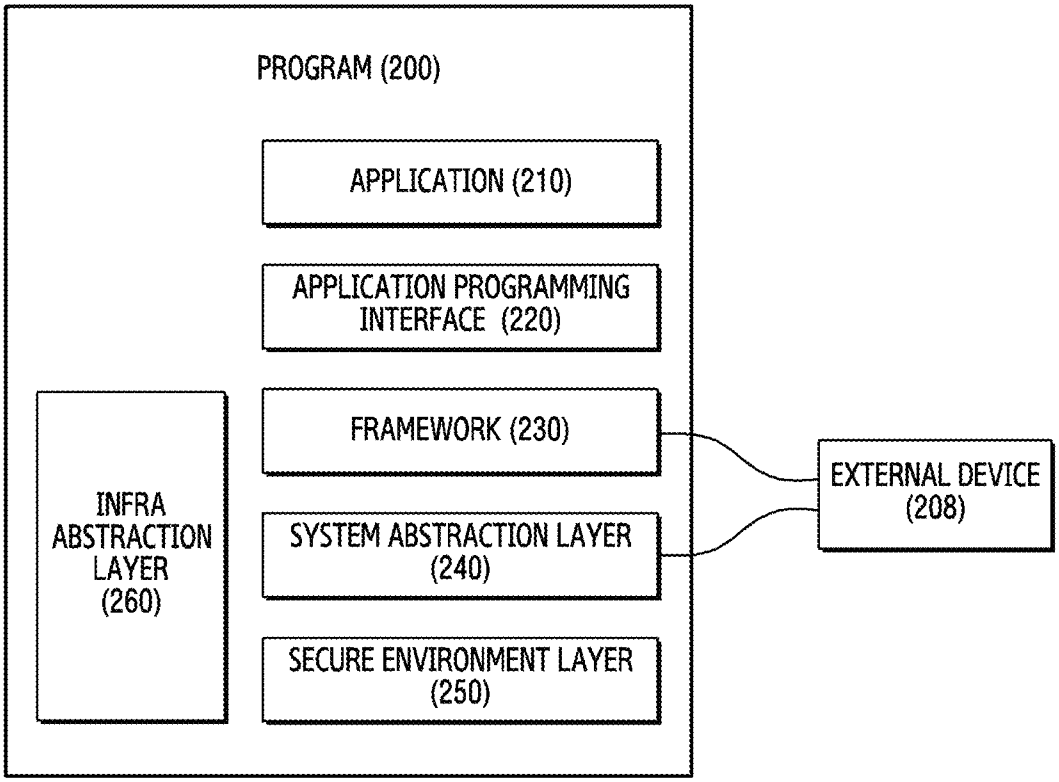
FIG. 2 illustrates a block diagram of a program module according to various embodiments.

FIG. 2 illustrates a block diagram of a program module 200 (e.g., the program 140) according to various embodiments.

Referring to FIG. 2, an electronic device (e.g., the electronic device 101) may drive based on the program module 200, and communicate with an external device 208 (e.g., the electronic device 102 or 108, the server 108). The program module 200 may include an application 210 (e.g., the application 146), an application programming interface (API) 220, a framework 230, a system abstraction layer 240, a secure environment layer 250, and an infra abstraction layer 260. At least part of the program module 200 may be preloaded on the electronic device or downloaded from the external device 208.

The application 210 may be provided to visually use or manage an electronic key in the electronic device. The application 210 may include a graphic user interface (GUI) associated with the electronic key. The API 220 may provide all of functions regarding the electronic key as an integrated interface. For example, the API 220 is a set of application programming functions, and may differ according to an operating system (e.g., the operating system 142). The framework 230 may provide interoperability between the external device 208 and the API 220. The framework 230 may communicate with the external device 208 (e.g., the electronic device 104, the server 108) which provides a service regarding the electronic key. The system abstraction layer 240 may provide interoperability between the external device 208 and the secure environment layer 250. The system abstraction layer 240 may communicate with the external device 208 which provides a security service of the electronic key. The secure environment layer 250 may provide a security-enhanced storage environment based on hardware or software. The infra abstraction layer 260 may communicate with an external device (e.g., the electronic device 102) to use the electronic key. The external electronic device may include a door lock. For example, the door lock may be attached to a door of a building, a room, a vehicle, or a locker.

The external device 208 may provide a service regarding the electronic key and a security service of the electronic key. The external device 208 may manage information regarding a user of the electronic device, the electronic key, and an electronic key provider. The external device 208 may provide a security protocol for the security of the electronic key. According to an embodiment, the external device 208 may provide all of the service regarding the electronic key and the security service of the electronic key. According to another embodiment, the external device 208 may include a first server for the service regarding the electronic key and a second server for the security service of the electronic key.

According to various embodiments, with regard to an electronic key of the door lock, key information and credential information may be defined. The key information is related to the electronic key and may indicate attribute information of the electronic key. The credential information may indicate a private value assigned to the electronic key for the door lock control credential. For example, the credential information may include at least one of a password, a certificate, or an authentication key. The key information and the credential information include identification information of the electronic key and may be mapped based on the identification information of the electronic key.

According to various embodiments, the electronic device may control the door lock using the credential information. Without the credential information in the electronic device, the electronic device may not control the door lock using the electronic key. With the credential information in the electronic device, the electronic device may control the door lock using the electronic key. For example, the electronic device may control at least one of open, close, or initialization of the door lock.

According to various embodiments, based on the key information, the electronic device may display a GUI regarding the electronic key. The key information may include status information indicating the presence or the absence of the credential information, in response to the electronic key. Without the credential information in the electronic device, the electronic device may display the electronic key in an inactive status in the GUI. With the credential information in the electronic device, the electronic device may display the electronic key in an active status in the GUI.

Figure 3:
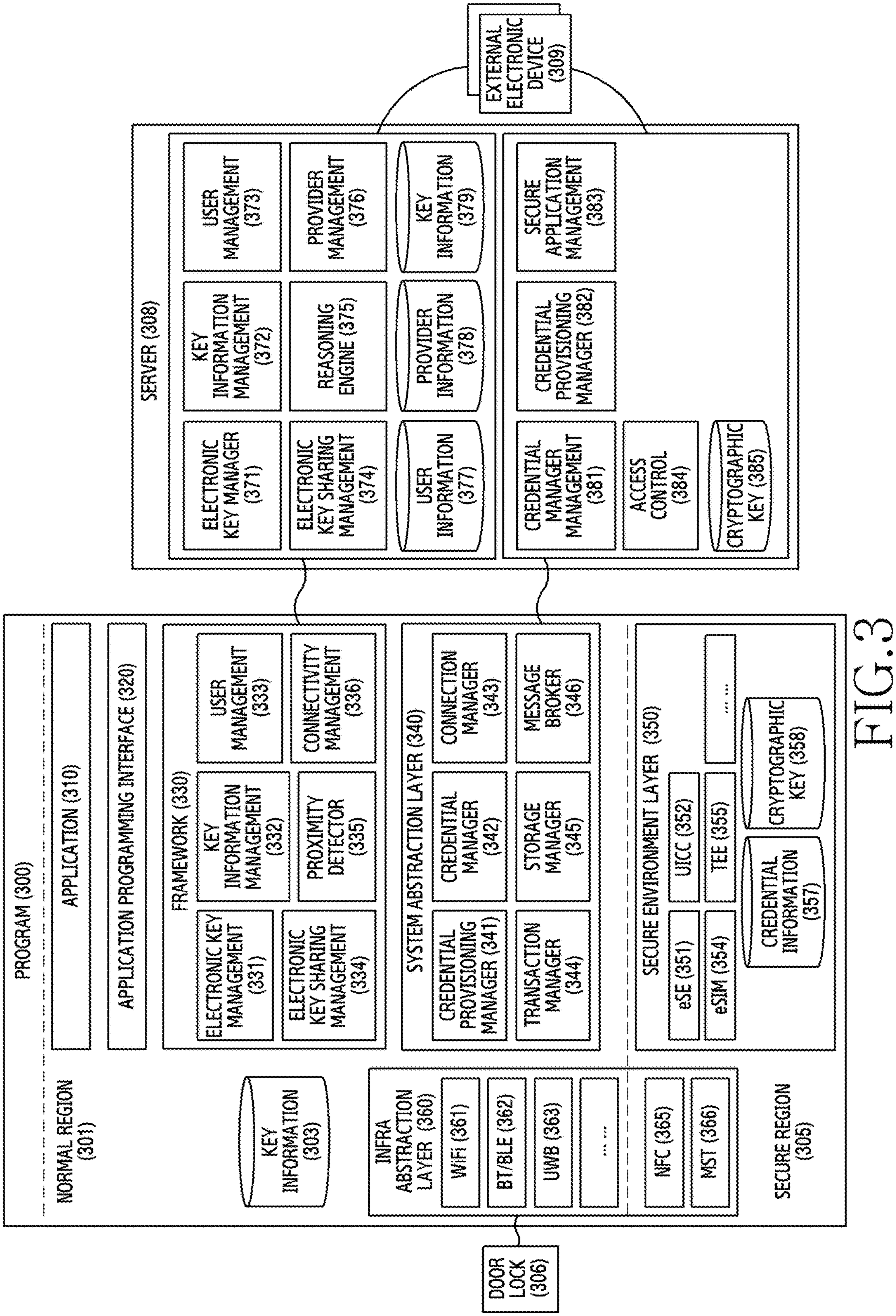
FIG. 3 illustrates a block diagram of a program module according to an embodiment.

FIG. 3 illustrates a block diagram of a program module 300 (e.g., the program 140, the program module 200) according to an embodiment.

Referring to FIG. 3, an electronic device (e.g., the electronic device 101) may drive based on the program module 300, and communicate with a door lock 306 (e.g., the electronic device 102), and external devices 308 and 309. The external devices 308 and 309 may include a server 308 (e.g., the server 108, the external device 208) and an external electronic device 309 (e.g., the electronic device 104). The server 308 may communicate with the external electronic device 309 and thus provide a service to the electronic device. The external electronic device 309 is an electronic device of a provider which manufactures or manages the door lock 306, or a provider which provides the electronic key service, such as a hotel, a car rental company, a delivery service customer, and may provide credential information of the electronic key.

The program module 300 may include a normal region 301 and a secure region 305. The program module 300 may include an application 310 (e.g., the application 146, the application 210), an API 320 (e.g., the API 220), a framework 330 (e.g., the framework 230), a system abstraction layer 340 (e.g., the system abstraction layer 240), a secure environment layer 350 (e.g., the secure environment layer 250), and an infra abstraction layer 360 (e.g., the infra abstraction layer 260). The application 310, the API 320, the framework 330, and the system abstraction layer 340 may be provided in the normal region 301, and the secure environment layer 350 may be provided in the secure region 305. The infra abstraction layer 360 may be provided in at least one of the normal region 301 or the secure region 305.

Key information 303 may be stored in the normal region 301. The key information 303 may include at least one of electronic key identification information, identification information of an electronic device (e.g., the electronic device 101), identification information of the door lock 306, an electronic key communication scheme, an electronic key name, an electronic key identifier per provider, time data of the electronic key, location data of the electronic key, or status information of the electronic key. The electronic key communication scheme is a communication scheme between the electronic device and the door lock 306 for using the electronic key, and may be determined to at least one of, for example, WiFi, Bluetooth/Bluetooth low energy (BLE), ultra wide band (UWB), near field communication (NFC), or magnetic secure transmission (MST). The electronic key name may be displayed in a GUI and determined to be obtained by a user. The electronic key identifier may be determined according to, for example, a business type of the provider. The time data of the electronic key may indicate a validity period of the electronic key, and include, for example, a start point and an end point. The location data of the electronic key may indicate an available location of the electronic key, and include, for example, latitude and longitude of the door lock. The status information of the electronic key may indicate presence or absence of credential information corresponding to the electronic key in the electronic device, and may be determined to one of, for example, the inactive status or the active status.

The framework 330 may include electronic key management 331, key information management 332, user management 333, electronic key sharing management 334, proximity detector 335, and connectivity management 336. The electronic key management 331 may manage the electronic key. The electronic key management 331 may provide binding such as a communication scheme per electronic key, a storage location, an issue status indicating issue completed or issue pending, and door lock information. The key information management 332 may manage the key information 303. The user management 333 may manage user information. The user management 333 may manage at least one of electronic device identification information or user account information. The electronic key sharing management 334 may share the electronic key with the external electronic device (e.g., the electronic device 102, 104). The proximity detector 335 may detect the door lock 306 within a predefined radius. The proximity detector 335 may detect a distance between the electronic device and the door lock 306. The connectivity management 336 may manage a radio connection session of the electronic device. The connectivity management 336 may manage the session for at least one of the connection between the electronic device and the door lock 306 or the connection of the electronic device and the server 308 (e.g., the external device 208).

The system abstraction layer 340 may include a credential provisioning manager 341, a credential manager 342, a connection manager 343, a transaction manager 334, a storage manager 345, and a message broker 346. The credential provisioning manager 341 may generate and manage a cryptographic key 358 for security of credential information 357. The credential provisioning manager 341 may forward the cryptographic key 358 to the secure environment layer 350. The credential manager 342 may manage the credential information 357. The credential manager 342 may receive the credential information 357 from the server 308 and forward to the secure environment layer 350. The connection manager 343 may manage connection resource for the electronic device. The connection manager 343 may establish or delete the session with at least one of the door lock 306 or the server 308. The transaction manager 334 may trace transaction in using and forwarding the credential information. The storage manager 345 may determine a region for managing the credential information 357 in the secure environment layer 350. The storage manager 345 may store the credential information 357 in the secure environment layer 350 or request the stored credential information 357. The message broker 346 may provide a security protocol between the system abstraction layer 340 and the server 308.

The secure environment layer 350 may provide a security-enhanced storage environment based on hardware or software. For example, the storage environment may include at least one of embedded secure element (eSE) 351, universal integrated circuit card (UICC) 352, embedded subscriber identity module (eSIM) 354, or trusted execution environment (TEE) 355. In various embodiments, the TEE 355 may be used to store the credential information 357 and the cryptographic key 358 with the security retained. The secure environment layer 350 may store the credential information 357 and the cryptographic key 358 of the electronic key. The credential information 357 may include the electronic key identification information and a private value for control credential of the door lock 306. The cryptographic key 358 may be used for the security of the credential information 357.

The infra abstraction layer 360 may wirelessly communicate with the door lock 306 to use the electronic key. For example, the wireless communication may include at least one of WiFi 361, BT/BLE 362, UWB 363, NFC 364, or MST 365. The WiFi 361, the BT/BLE 362, and the UWB 363 may be provided in the normal region 301, and the NFC 364 and the MST 365 may be provided in the secure region 305.

The server 308 may include electronic key management 371, key information management 372, user management 373, electronic key sharing management 374, reasoning engine 375, and provider management 376. The electronic key management 371 may mange the electronic key. The electronic key manager 371 may provide binding such as the communication scheme per electronic key, the storage location, the issue status indicating issue complete or issue pending, and the door lock information. The key information management 372 may manage key information per electronic key. The user management 373 may manage user information. The user management 373 may manage at least one of the electronic device identification information or the user account information, and provide single sign on (SSO). The electronic key sharing management 374 may share the electronic key with an external electronic device. The electronic key sharing management 374 may scan the external electronic device and provide the electronic key to the external electronic device. The reasoning engine 375 may recommend the electronic key to the electronic device. The reasoning engine 375 may recommend the electronic key to the electronic device, based on at least one of the distance between the electronic device and the door lock 306, and the location or the time of the door lock 306. The provider management 376 may manage information regarding the provider 309 of the electronic key. The server 308 may store electronic key user information 377, provider information 378, and key information 379.

The server 308 may include credential manager management 381, credential provisioning manager 382, secure application management 383, and access control 384. The credential manager management 381 may manage the credential manager 342 of the electronic device. The credential provisioning manager 382 may generate and manage the cryptographic key 385 for the security of the credential information per electronic key. The secure application management 383 may install and manage a secure application in the secure environment layer 350 of the electronic device. The access control 384 may manage connection resource for the electronic device. The access control 384 may establish or delete a session with the electronic device. The server 308 may store the cryptographic key 385.

According to various embodiments, an electronic device (e.g., the electronic device 101) may include a touch screen display (e.g., the display device 160), a wireless communication circuit (e.g., the wireless communication circuit 192), at least one processor (e.g., the processor 120) operatively connected to the display and the communication circuit, and a memory (e.g., the memory 130) operatively connected to the processor.

According to various embodiments, the memory may store instructions which, when executed, cause the processor to receive first information associated with a first electronic key of a first door lock via the communication circuit, to display a first GUI associated with the first electronic key to indicate an inactive status of the first electronic key on the display, to receive first credential information associated with the first electronic key via the communication circuit, and after receiving the first credential information, to change the first GUI to indicate an active status of the first electronic key.

According to various embodiments, the instructions may cause the processor to receive second information associated with a second electronic key of a second door lock via the communication circuit, and to display a second GUI associated with the second electronic key, to indicate an inactive status of the second electronic key on the display. According to various embodiments, the instructions may cause the processor to receive a gesture input via the display, and to provide a scrolling effect to change from displaying the first GUI to displaying the second GUI or vice versa, based at least in part on the gesture input.

According to various embodiments, the instructions may cause the processor to receive second credential information associated with the second electronic key via the communication circuit, and after receiving the second credential information, to change the second GUI to indicate an active status of the second electronic key.

According to various embodiments, the instructions may cause the processor to display at least part of the first information through the first GUI.

According to various embodiments, the first information may include at least one of location information of the first door lock or time data indicating a validity period of the first electronic device.

According to various embodiments, the instructions may cause the processor to display the first GUI to indicate any one of the inactive status or the active status of the first electronic device, based on at least one of the location data or the time data.

According to various embodiments, the instructions may cause the processor to receive a gesture input through the display, and to display the first GUI or a third GUI associated with an electronic card, based on at least one of the location data or the time data.

According to various embodiments, the instructions may cause the processor to display a button corresponding to the first electronic key on the display, based on at least one of the location data or the time data, to detect selection of the button, and to display the first GUI to indicate any one of the inactive status or the active status of the first electronic device.

According to various embodiments, the instructions may cause the processor to display a notification corresponding to the first electronic key on the display, based on at least one of the location data or the time data, to detect selection of the notification, and to display the first GUI to indicate any one of the inactive status or the active status of the first electronic device.

According to various embodiments, the instructions may cause the processor to request the first credential information, based on at least one of a user request, the location data, or the time data.

Figure 4:
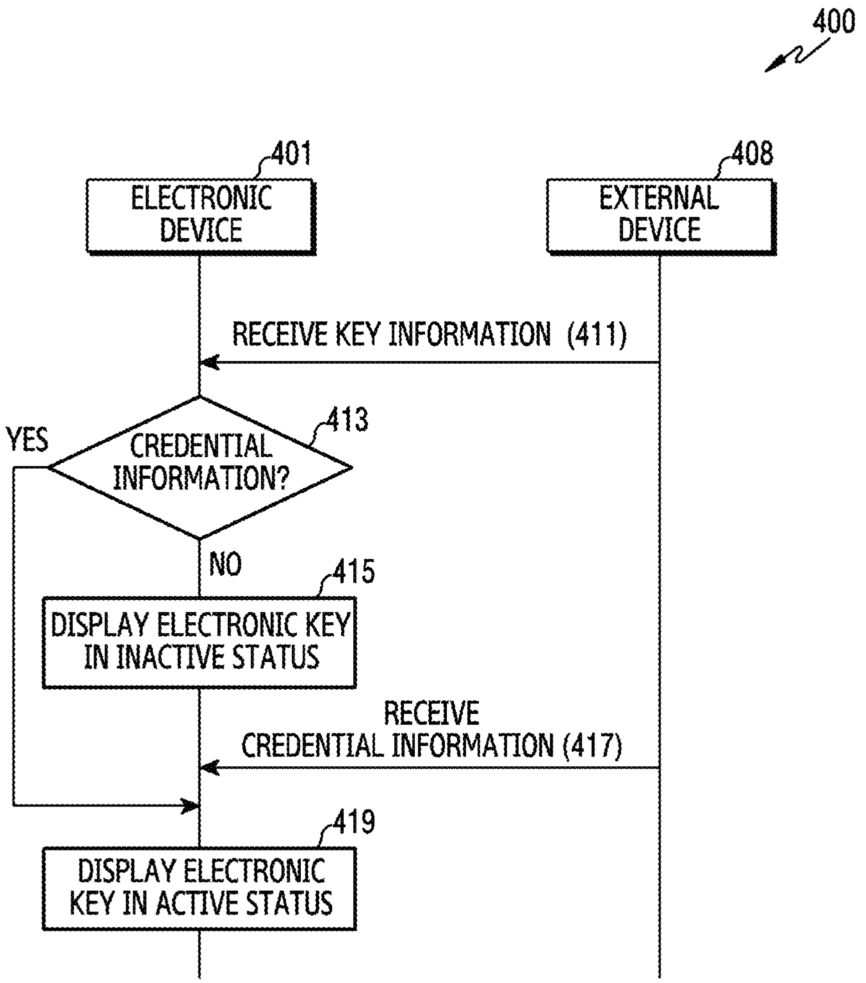
FIG. 4 illustrates a flowchart of an operating method of an electronic device according to various embodiments.

FIG. 4 illustrates a flowchart of an operating method 400 of an electronic device 401 (e.g., the electronic device 101) according to various embodiments.

Referring to FIG. 4, an electronic device 401 and an external device 408 (e.g., the server 108, the external device 208, the server 308) may communicate with each other in a network environment. The electronic device 401 may receive key information associated with an electronic key of a door lock (e.g., the door lock 306) and credential information associated with the electronic key, from the external device 408. Hence, the electronic device 401 may display a GUI associated with the electronic key.

The electronic device 401 may receive the key information from the external device 408 in operation 411. According to an embodiment, the electronic device 401 may receive the key information, without the credential information associated with the electronic key. The electronic device 401 may store the key information, in response to the electronic key. According to another embodiment, the electronic device 401 may receive the key information together with the credential information associated with the electronic key. The electronic device 401 may store the key information and the credential information, in response to the electronic key. The electronic device 401 may determine whether credential information associated with the electronic key exists in the electronic device 401 in operation 413. In response to the electronic key, the electronic device 401 may determine whether the credential information is pre-stored.

If there is no credential information in the electronic device 401 in operation 413, the electronic device 401 may display the electronic key in the inactive status in operation 415. The electronic device 401 may display a GUI associated with the electronic key and indicate the electronic key of the inactive status in the GUI. The electronic device 401 may display at least part of the key information associated with the electronic key in the GUI. The electronic device 401 may receive the credential information associated with the electronic key from the external device 408 in operation 417. The electronic device 401 may store the credential information, in response to the electronic key. The electronic device 401 may display the electronic key in the active status in operation 419. The electronic device 401 may display the electronic key of the active status in the GUI, by changing the GUI associated with the electronic key. The electronic device 401 may continuously display at least part of the key information associated with the electronic key in the GUI.

If there is credential information in the electronic device 401 in operation 413, the electronic device 401 may display the electronic key in the active status in operation 419. The electronic device 401 may display the GUI associated with the electronic key and indicate the electronic key of the active status in the GUI. The electronic device 401 may display at least part of the key information associated with the electronic key in the GUI.

Figure 5:
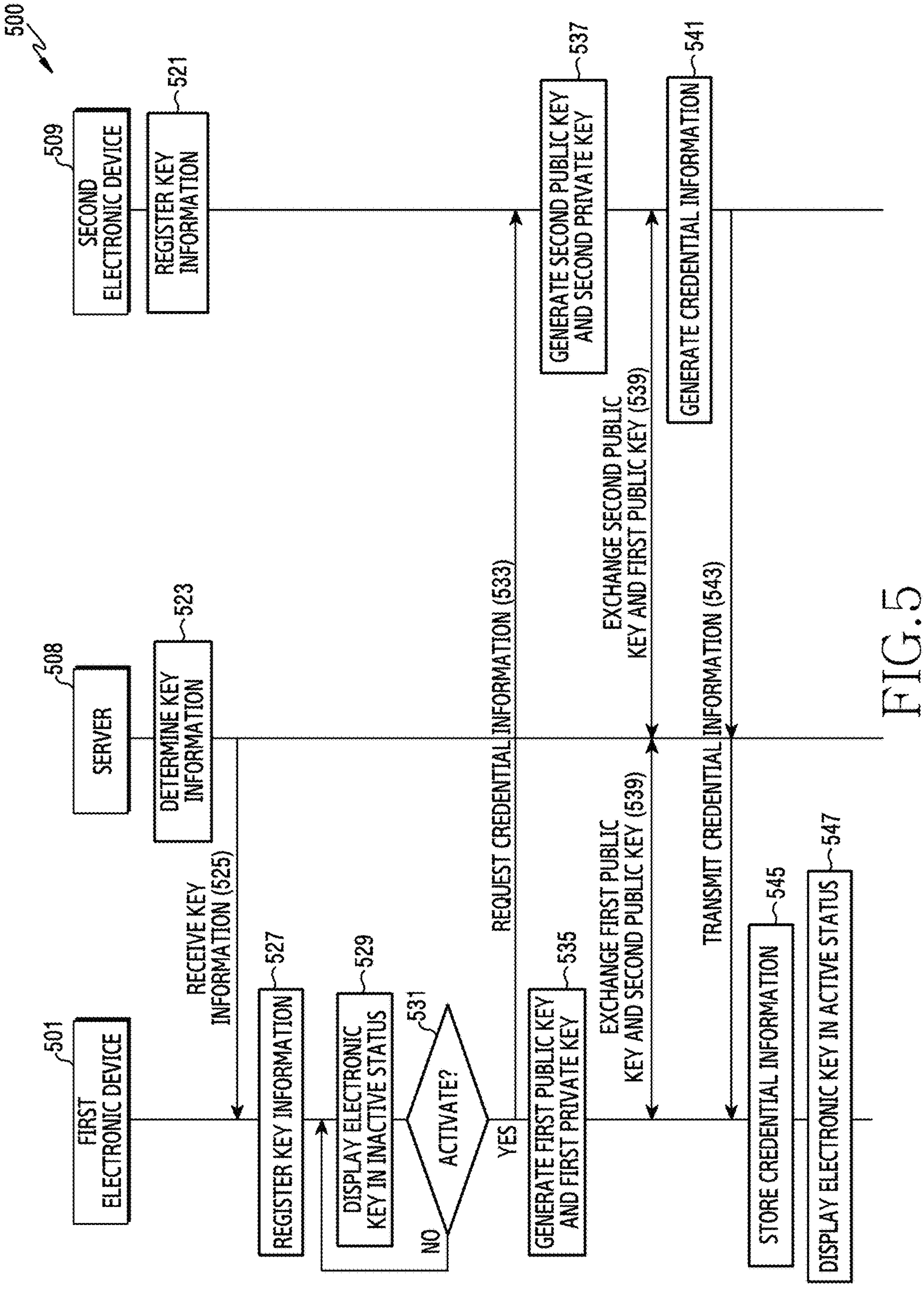
FIG. 5 illustrates a flowchart of an operating method of an electronic device according to an embodiment.

FIG. 5 illustrates a flowchart of an operating method 500 of an electronic device 501 (e.g., the electronic device 101, the electronic device 401) according to an embodiment.

Referring to FIG. 5, the first electronic device 501, a server 508 (e.g., the external device 308, the external device 408), and a second electronic device 509 (e.g., the external electronic device 308) may communicate with each other in a network environment. The first electronic device 401 may receive key information associated with an electronic key of a door lock (e.g., the door lock 306) and credential information associated with the electronic key, from the server 508. The credential information may be generated at the second electronic device 509. Hence, the electronic device 501 may display a GUI associated with the electronic key.

The second electronic device 509 may register the key information associated with the electronic key in operation 521. The server 508 may determine the key information associated with the electronic key in operation 523. For doing so, the second electronic device 509 and the server 508 may cooperate with each other.

For example, the second electronic device 509 may transmit the key information to the server 508. The second electronic device 509 may configure at least part of the key information, based on data inputted by a user of the second electronic device 509, that is, a provider. Alternatively, the second electronic device 509 may receive at least part of the key information from the first electronic device 501. For example, a user of the first electronic device 501 inputs at least part of the key information using a webpage or an application managed at the second electronic device 509, and the second electronic device 509 may obtain at least part of the key information from the first electronic device 501. Alternatively, the second electronic device 509 may receive at least part of the key information from an external device. For example, the user of the first electronic device 501 inputs at least part of the key information using a webpage or an application managed at the external device, and the second electronic device 509 may obtain at least part of the key information from the external device. Thus, the second electronic device 509 may register the key information, and then transmit the key information to the server 508. Hence, the server 508 may receive the key information from the second electronic device 509 and determine the key information.

For example, the server 208 may transmit the key information to the second electronic device 509. The server 508 may determine the key information associated with the electronic key, based on a request of at least one of the first electronic device 501 or the second electronic device 509. At least part of the key information may be configured by at least one of the first electronic device 501 or the second electronic device 509. At least part of the key information may be received from any one of the first electronic device 501 or the second electronic device 509. Alternatively, part of the key information may be received from one of the first electronic device 501 or the second electronic device 509, and other part of the key information may be received from the other of the first electronic device 501 or the second electronic device 509. Alternatively, at least part of the key information may be received from an external device. For example, the user of the first electronic device 501 inputs at least part of the key information by accessing a webpage managed at the external device, and the server 508 may receive at least part of the key information from the external device. Thus, the server 508 may determine the key information, and then transmit the key information to the second electronic device 509. Hence, the second electronic device 509 may receive the key information from the server 508 and register the key information.

The first electronic device 501 may receive the key information associated with the electronic key from the server 508 in operation 525. In response to the electronic key, the first electronic device 501 may register the key information in operation 527. The first electronic device 501 may display the electronic key in the inactive status in operation 529. The electronic device 501 may display a GUI associated with the electronic key and indicate the electronic key of the inactive status in the GUI. The electronic device 501 may display the GUI, in response to an event for displaying the electronic key. For example, the event for displaying the electronic key may be generated based on a user request or the key information of the first electronic device 501.

The first electronic device 501 may detect an event for activating the electronic key in operation 531. The event for activating the electronic key may be occurred if a predetermined condition is satisfied. For example, the condition for activating the electronic key may be determined based on at least one of a user request of the first electronic device 501, a request of the second electronic device 509, a distance between the first electronic device 501 and the door lock, time data in the key information, or location data in the key information. If detecting the event for activating the electronic key in operation 531, the first electronic device 501 may request credential information associated with the electronic key from the second electronic device 509 in operation 533. The first electronic device 501 may directly request the credential information from the second electronic device 509. Alternatively, the first electronic device 501 may request the credential information from the second electronic device 509 via the server 508.

The first electronic device 501 may generate a first public key and a first private key in operation 535. The first electronic device 501 may generate the first public key and the first private key, based on a preset algorithm. The first electronic device 501 may generate the first public key and the first private key, based on the key information. The second electronic device 509 may generate a second public key and a second private key in operation 537. The second electronic device 509 may generate the second public key and the second private key, based on a preset algorithm. The second electronic device 509 may generate the second public key and the second private key, based on the key information. The server 508 may exchange the first public key and the second public key between the first electronic device 501 and the second electronic device 509 in operation 539. The server 508 may receive the first public key from the first electronic device 501, and transmit the first public key to the second electronic device 509. The server 508 may receive the second public key from the second electronic device 509, and transmit the second public key to the first electronic device 501.

The second electronic device 509 may generate credential information in operation 541. The second electronic device 509 may encrypt the credential information, based on the first public key, the second public key, and the second private key. The second electronic device 509 may transmit the credential information to the server 508.

The first electronic device 501 may receive the credential information from the server 508 in operation 543. The first electronic device 501 may decrypt the encrypted credential information, based on the first public key, the second public key, and the first private key. The first electronic device 501 may store the credential information in response to the electronic key in operation 545. The first electronic device 501 may display the electronic key in the active status in operation 547. The first electronic device 501 may display the electronic key of the active status in the GUI by changing the GUI associated with the electronic key. The first electronic device 501 may display the GUI, in response to an event for displaying the electronic key. For example, the event for displaying the electronic key may occur if the credential information is received or based on a user request or the key information of the first electronic device 501.

Figure 6:
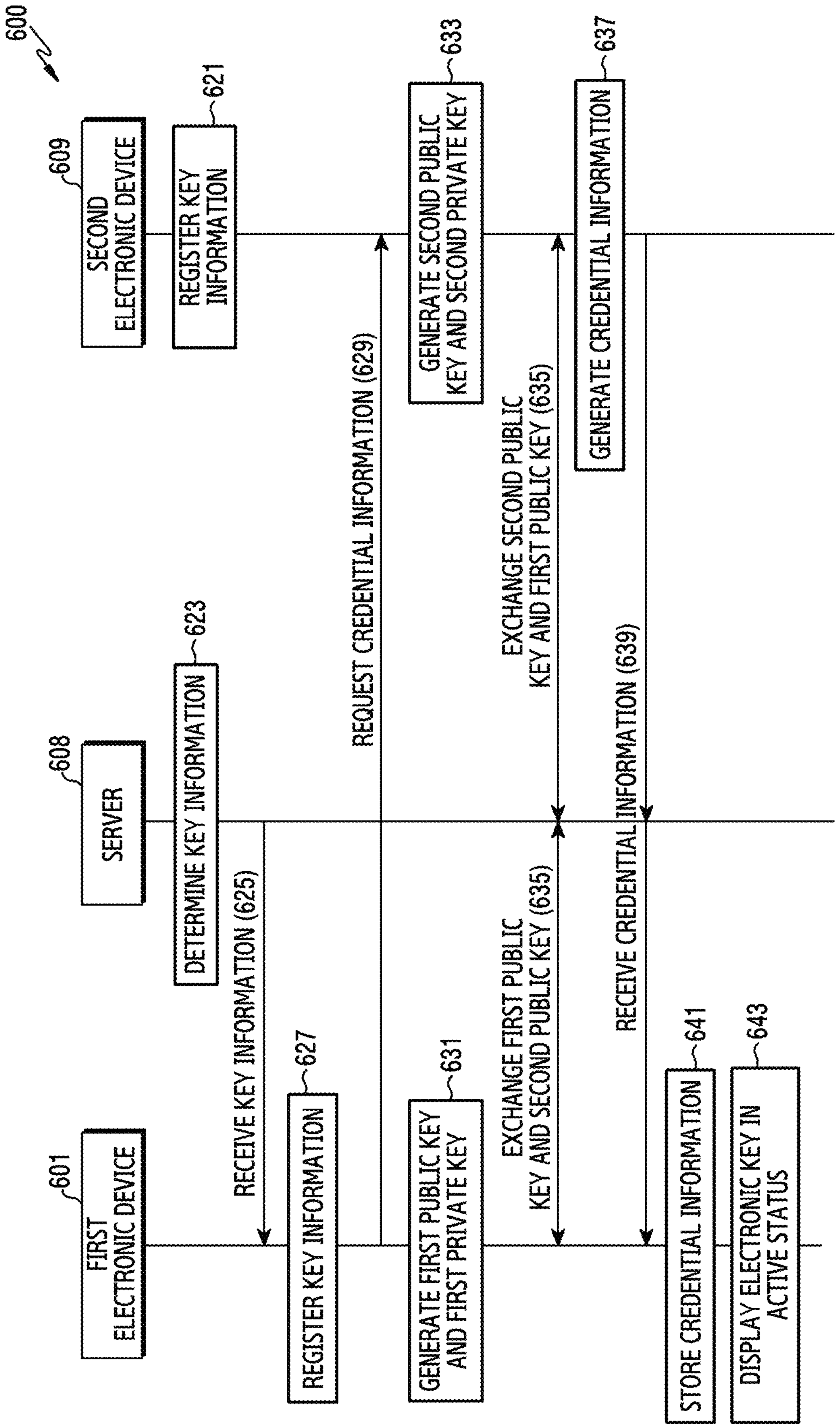
FIG. 6 illustrates a flowchart of an operating method of an electronic device according to another embodiment.

FIG. 6 illustrates a flowchart of an operating method 600 of an electronic device 601 (e.g., the electronic device 101, the electronic device 401) according to another embodiment.

Referring to FIG. 6, the first electronic device 601, a server 608 (e.g., the external device 308, the external device 408), and a second electronic device 609 (e.g., the external electronic device 308) may communicate with each other in a network environment. The first electronic device 601 may receive key information associated with an electronic key of a door lock (e.g., the door lock 306) and credential information associated with the electronic key, from the server 608. The credential information may be generated at the second electronic device 609. Hence, the electronic device 601 may display a GUI associated with the electronic key.

The second electronic device 609 may register the key information associated with the electronic key in operation 621. The server 608 may determine the key information associated with the electronic key in operation 623. For doing so, the second electronic device 609 and the server 608 may cooperate with each other.

For example, the second electronic device 609 may transmit the key information to the server 608. The second electronic device 609 may configure at least part of the key information, based on data inputted by a user, that is, a provider of the second electronic device 609. Alternatively, the second electronic device 609 may receive at least part of the key information from the first electronic device 601. Alternatively, the second electronic device 609 may receive at least part of the key information from an external device. For example, the user of the first electronic device 601 inputs at least part of the key information by accessing a webpage managed by the external device, and the second electronic device 609 may receive at least part of the key information from the external device. Thus, the second electronic device 609 may register the key information, and then transmit the key information to the server 608. Hence, the server 608 may receive the key information from the second electronic device 609 and determine the key information.

For example, the server 208 may transmit the key information to the second electronic device 609. The server 608 may determine the key information associated with the electronic key, based on a request of at least one of the first electronic device 601 or the second electronic device 609. At least part of the key information may be configured by at least one of the first electronic device 601 or the second electronic device 609. At least part of the key information may be received from at least one of the first electronic device 601 or the second electronic device 609. Alternatively, part of the key information may be received from one of the first electronic device 601 or the second electronic device 609, and other part of the key information may be received from the other of the first electronic device 601 or the second electronic device 609. Alternatively, at least part of the key information may be received from an external device. For example, the user of the first electronic device 601 inputs at least part of the key information by accessing a webpage managed at the external device, and the server 608 may receive at least part of the key information from the external device. Thus, the server 608 may determine the key information, and then transmit the key information to the second electronic device 609. Hence, the second electronic device 609 may receive the key information from the server 608 and register the key information.

The first electronic device 601 may receive the key information associated with the electronic key from the server 608 in operation 625. In response to the electronic key, the first electronic device 601 may register the key information in operation 627. The first electronic device 601 may request credential information associated with the electronic key from the second electronic device 609 in operation 629. The first electronic device 601 may directly request the credential information from the second electronic device 609. Alternatively, the first electronic device 601 may request the credential information from the second electronic device 609 via the server 608.

The first electronic device 601 may generate a first public key and a first private key in operation 631. The first electronic device 601 may generate the first public key and the first private key, based on a preset algorithm. The first electronic device 601 may generate the first public key and the first private key, based on the key information. The second electronic device 609 may generate a second public key and a second private key in operation 633. The second electronic device 609 may generate the second public key and the second private key, based on a preset algorithm. The second electronic device 609 may generate the second public key and the second private key, based on the key information. The server 608 may exchange the first public key and the second public key between the first electronic device 601 and the second electronic device 609 in operation 635. The server 608 may receive the first public key from the first electronic device 601 and transmit the first public key to the second electronic device 609. The server 608 may receive the second public key from the second electronic device 609 and transmit the second public key to the first electronic device 601.

The second electronic device 609 may generate credential information in operation 637. The second electronic device 609 may encrypt the credential information, based on the first public key, the second public key, and the second private key. The second electronic device 609 may transmit the credential information to the server 608. The first electronic device 601 may receive the credential information from the server 608 in operation 639. The first electronic device 601 may decrypt the encrypted credential information, based on the first public key, the second public key, and the first private key. The first electronic device 601 may store the credential information in response to the electronic key in operation 641. The first electronic device 601 may display the electronic key in the active status in operation 643. The first electronic device 601 may display the electronic key of the active status in the GUI by changing the GUI associated with the electronic key. The first electronic device 601 may display the GUI, in response to an event for displaying the electronic key. For example, the event for displaying the electronic key may occur if the credential information is received or based on a user request or the key information of the first electronic device 601.

Figure 7:
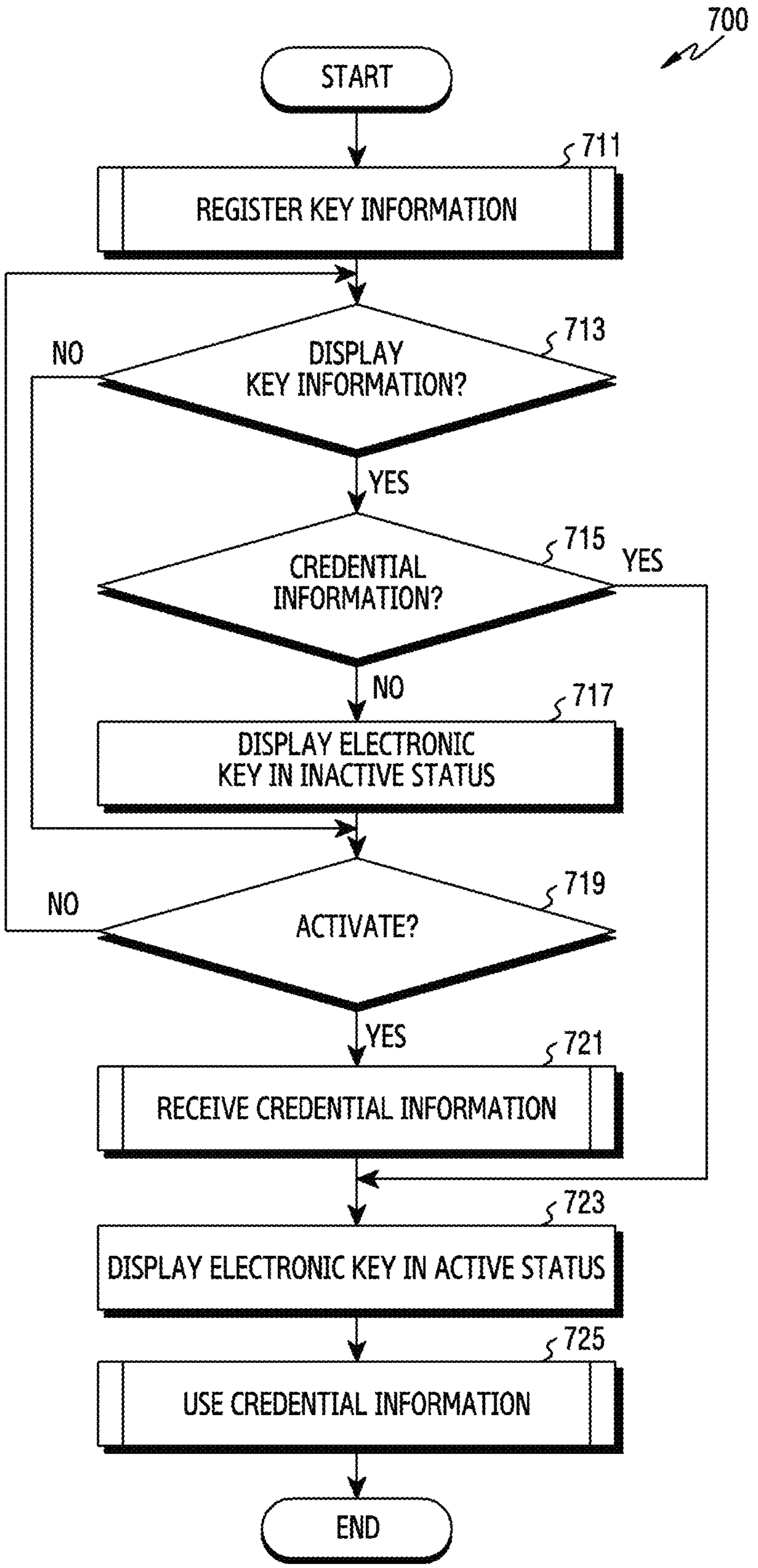
FIG. 7 illustrates a flowchart of an operating method of an electronic device according to various embodiments.

FIG. 7 illustrates a flowchart of an operating method 700 of an electronic device (e.g., the electronic device 401, the first electronic device 501, the first electronic device 601) according to various embodiments. FIGS. 8A, 8B, and 8C, FIG. 9, FIGS. 10A and 10B, FIG. 11, and FIG. 12 illustrate diagrams of the operating method 700 of an electronic device according to various embodiments.

Referring to FIG. 7, the electronic device may register key information associated with an electronic key in operation 711. The electronic device may store the key information, in response to the electronic key. The key information may include at least one of electronic key identification information, identification information of the electronic device, identification information of a door lock (e.g., the door lock 306), an electronic key communication scheme, an electronic key name, an electronic key identifier per provider, time data of the electronic key, location data of the electronic key, or status information of the electronic key. The electronic key communication scheme is a communication scheme between the electronic device for using the electronic key and the door lock, and may be determined to at least one of, for example, WiFi, BT/BLE, UWB, NFC, or MST. The electronic device may set the status information of the electronic key as the inactive status in the key information. For example, registering the key information at the electronic device shall be described by referring to FIG. 13.

Figure 13:
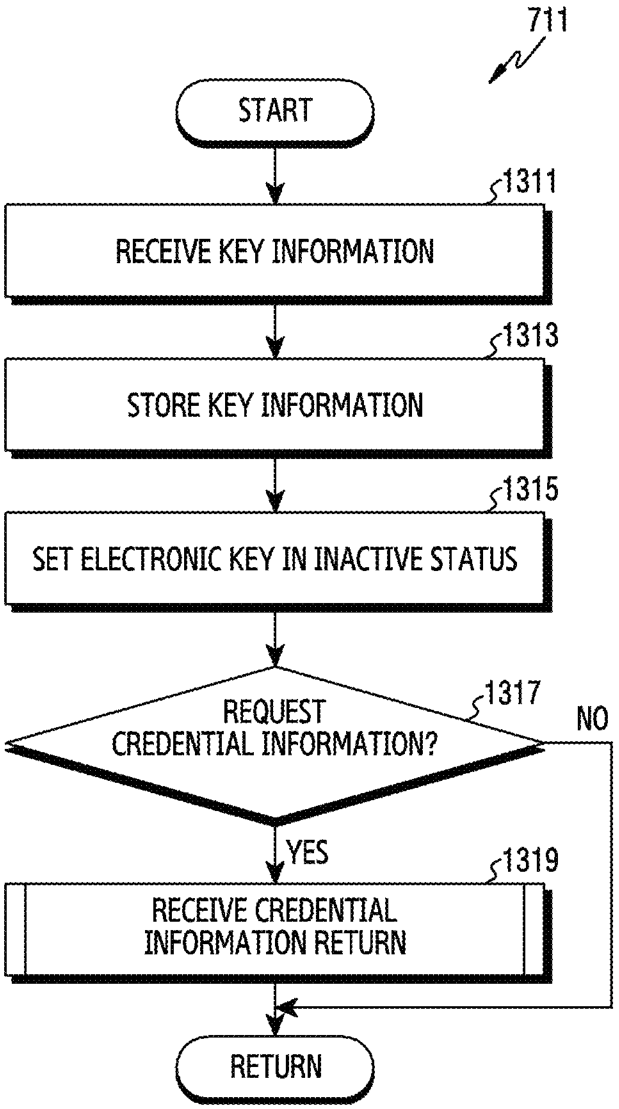
FIG. 13 illustrates a flowchart of registering key information of FIG. 7.

FIG. 13 illustrates a flowchart of registering the key information of FIG. 7.

Referring to FIG. 13, the electronic device may receive the key information associated with the electronic key in operation 1311. The electronic device may receive the key information from an external device (e.g., the external device 408, the server 508, the server 608). The electronic device may store the key information in operation 1313. The electronic device may store the key information, in response to the electronic key. The electronic device may set the inactive status of the electronic key in operation 1315. The electronic device may set the status information of the electronic key as the inactive status in the key information.

In operation 1317, the electronic device may determine whether to request the credential information associated with the electronic key. For example, the electronic device may require user's selection, to request the credential information. The electronic device may determine whether to request the credential information, based on the user's selection. Alternatively, the electronic device may determine whether to request the credential information, according to presetting. That is, the electronic device may determine whether or not the credential information request is preset, in response to receiving the key information. If determining not to request the credential information in operation 1317, the electronic device may return to FIG. 7. If determining to request the credential information in operation 1317, the electronic device may receive the credential information in operation 1319. Upon receiving the credential information, the electronic device may set the electronic key status information as the inactive status in the key information. For example, receiving the credential information at the electronic device shall be explained by referring to FIG. 14. After receiving the credential information, the electronic device may return to FIG. 7.

In operation 713, the electronic device may determine whether to display the electronic key. The electronic device may determine whether to display the electronic key, based on at least one of location data or time data of the electronic key in the key information. The electronic device may compare a current location with the location data of the electronic key. For example, the electronic device may determine whether the location data of the electronic key falls within a preset radius based on the current location. The electronic device may compare current time with the time data of the electronic key. For example, the electronic device may determine whether the current time data falls within the time data, that is, a validity period of the electronic key.

Figure 8C:
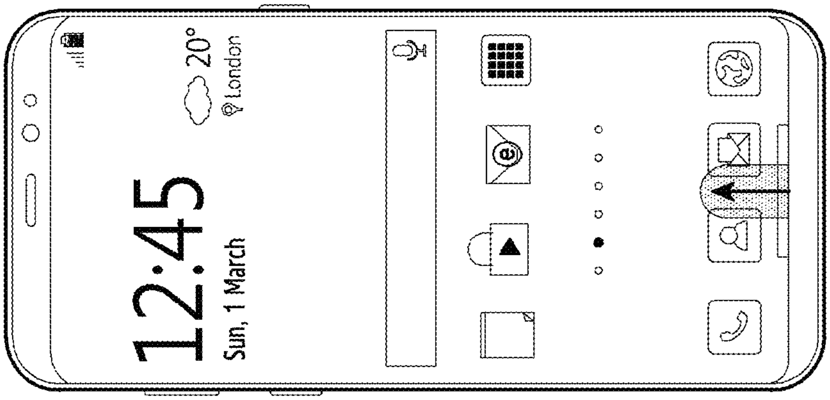
FIGS. 8A, 8B, and 8C, FIG. 9, FIGS. 10A and 10B, FIG. 11, and FIG. 12 illustrate diagrams of an operating method of an electronic device according to various embodiments.
Figure 8B:
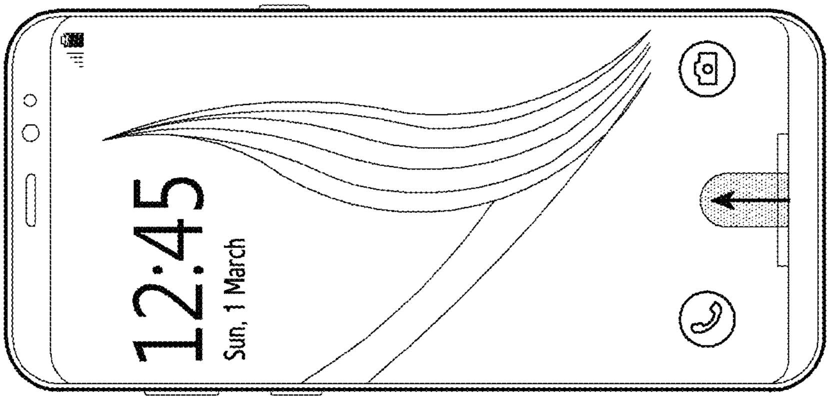
Figure 8A:
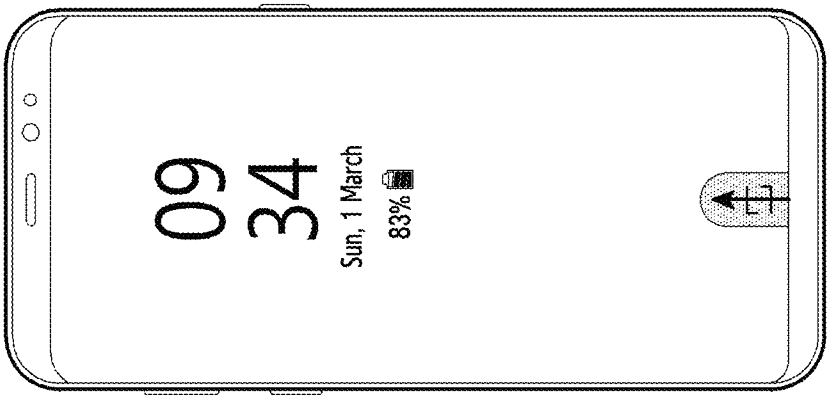
Figure 9:
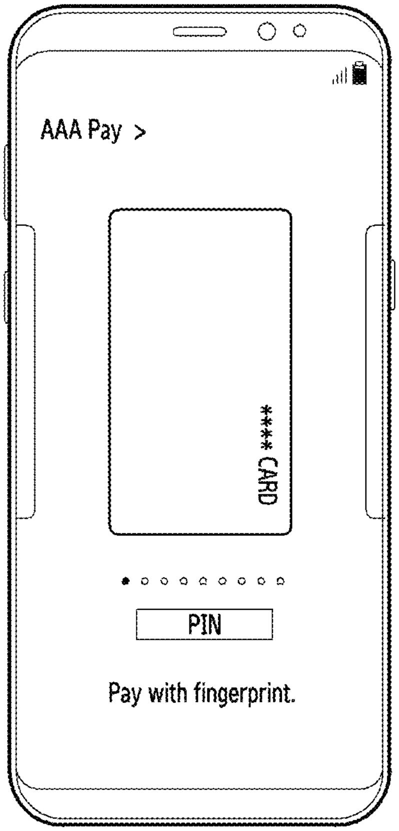

For example, the electronic device may determine whether to display the electronic key, based on a gesture input which is received through a touch screen display. If no screen is displayed as shown in FIG. 8A, if a home screen is displayed as shown in FIG. 8B, or if a lock screen is displayed as shown in FIG. 8C, the touch screen display may determine whether to display the electronic key, based on a gesture input from a preset region. For example, the gesture input may be the same as a gesture input for displaying an electronic card registered in the electronic device. That is, if determining not to display the electronic key, the electronic device may display an electronic card as shown in FIG. 9.

Figure 10A:
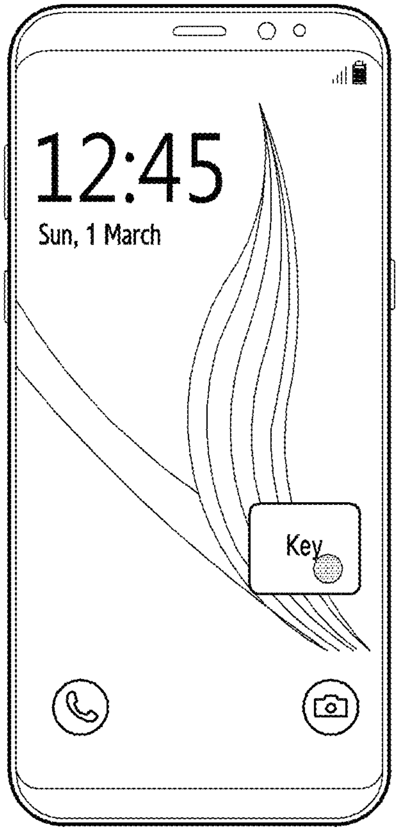
Figure 10B:
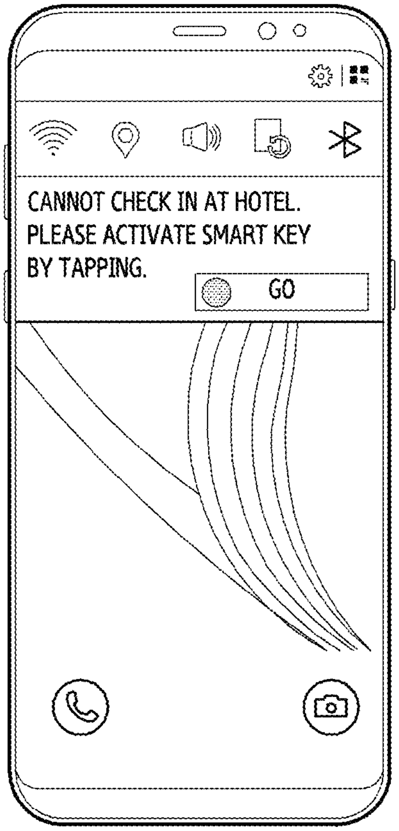

For example, the electronic device may detect an available electronic key, based on at least one of the location data or the time data of the electronic key in the key information. The electronic device may notify the presence of the available electronic key through a display device, and then determine whether to display the electronic key based on a user request. The electronic device may display a button for displaying the electronic key on the lock screen as shown in FIG. 10A or display a button for displaying the electronic key in notifications as shown in FIG. 10B. Next, the electronic device may determine whether to display the electronic key, according to whether or not the button is selected.

If determining to display the electronic key in operation 713, the electronic device may determine whether credential information associated with the electronic key exists in the electronic device in operation 715. If the location data of the electronic key falls within the preset radius based on the current location, the electronic device may determine to display the electronic key. If the current time falls within the time data, that is, the validity period of the electronic key, the electronic device may determine to display the electronic key. In this case, the electronic device may determine whether the credential information is pre-stored, in response to the electronic key. The electronic device may determine whether the credential information is pre-stored, based on the status information of the electronic key in the key information.

Figure 11:
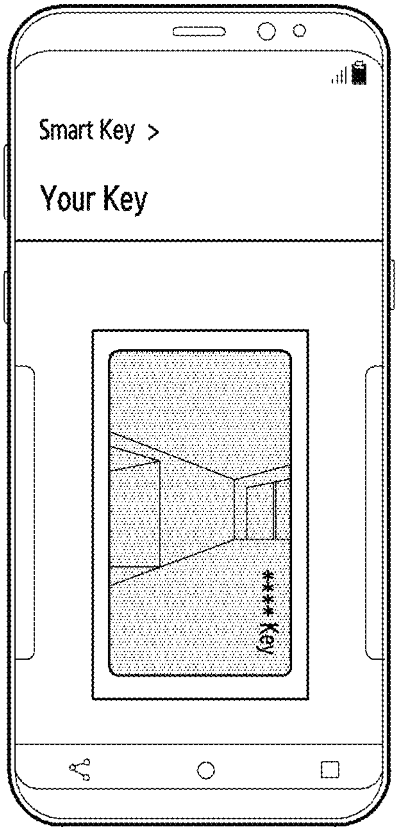

If determining no credential information in operation 715, the electronic device may display the electronic key in the inactive status in operation 717. If the electronic key status information is set as the inactive status in the key information, the electronic device may display the electronic key in the inactive status. The electronic device may display a GUI associated with the electronic key and indicate the electronic key of the inactive status in the GUI as shown in FIG. 11. For example, the electronic device may process the electronic key to be dimmer than setting of the display device. The electronic device may display at least part of the key information associated with the electronic key in the GUI.

In operation 719, the electronic device may determine whether to activate the electronic key. If determining not to display the electronic key in operation 713, the electronic device may determine whether to activate the electronic key in operation 719. Alternatively, if displaying the electronic key in the inactive status in operation 717, the electronic device may determine whether to activate the electronic key in operation 719. The electronic device may determine whether to activate the electronic key, according to whether a predetermined condition is satisfied. For example, the condition for activating the electronic key may be determined based on at least one of a user's request, a request of an external electronic device (e.g., the second electronic device 509, the second electronic device 609), a distance between the electronic device and a door lock corresponding to the electronic key, electronic key location data of the key information, or electronic key time information of the key information.

If determining to activate the electronic key in operation 719, the electronic device may receive credential information associated with the electronic key in operation 721. The electronic device may store the credential information, in response to the electronic key. The credential information may indicate a private value assigned to the electronic key for the door lock control credential. For example, the credential information may include at least one of a password, a certificate, or an authentication key. The credential information may be mapped to the key information, based on electronic key identification information. The electronic device may set the electronic key status information as the active status in the key information. The electronic device may change the electronic key status information from the inactive status to the active status in the key information. For example, receiving the credential information at the electronic device shall be described in FIG. 14.

Figure 14:
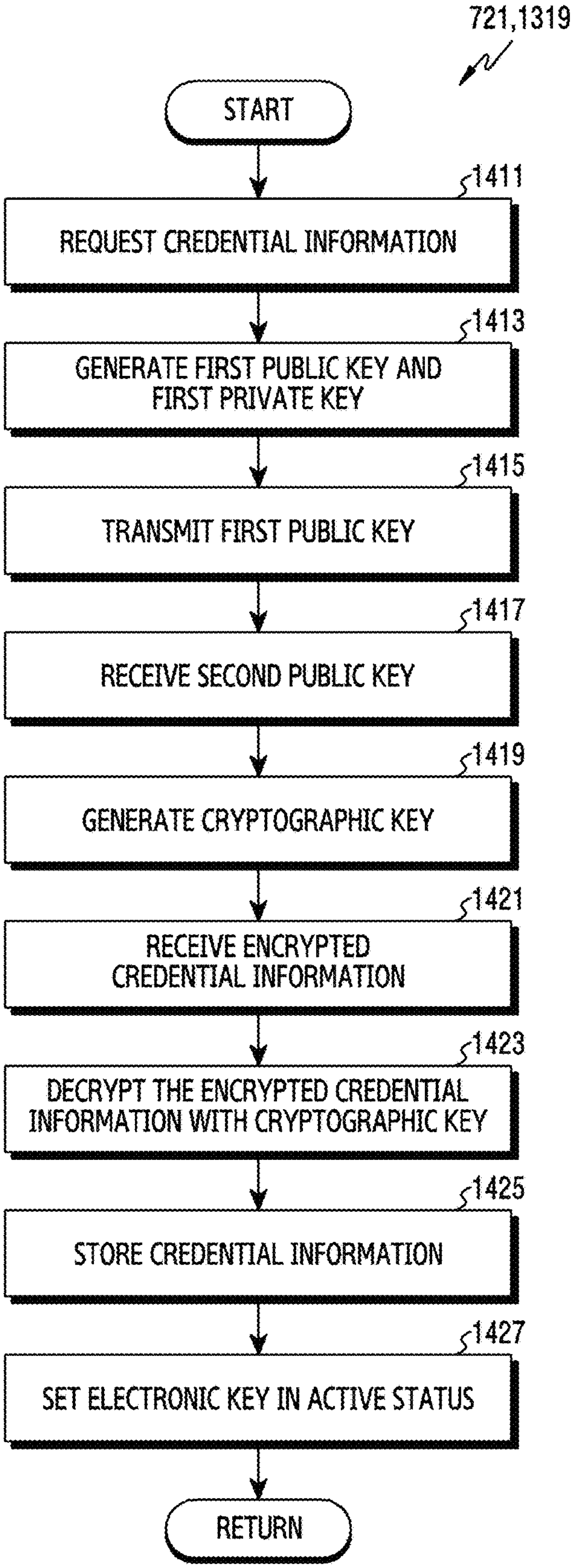
FIG. 14 illustrates a flowchart of receiving credential information of FIG. 7 and FIG. 13.

FIG. 14 illustrates a flowchart of receiving the credential information of FIG. 7 and FIG. 13.

Referring to FIG. 14, the electronic device may request the credential information in operation 1411. The electronic device may request the credential information from an external electronic device. The electronic device may request the credential information directly from the external electronic device. Alternatively, the electronic device may request the credential information from the external electronic device via an external device.

In operation 1413, the electronic device may generate a first public key and a first private key. The electronic device may generate the first public key and the first private key, based on a preset algorithm. The electronic device may generate the first public key and the first private key, based on the key information. The electronic device may transmit the first public key in operation 1415. The electronic device may transmit the first public key to the external device. The electronic device may receive a second public key in operation 1417. The electronic device may receive the second public key from the external device. The electronic device may generate a cryptographic key in operation 1419. The electronic device may generate the cryptographic key, based on the first public key, the second public key, and the first private key.

In operation 1421, the electronic device may receive encrypted credential information. The electronic device may receive the encrypted credential information from the external device. In operation 1423, the electronic device may decrypt the encrypted credential information. The electronic device may decrypt the encrypted credential information, with the cryptographic key. In operation 1425, the electronic device may store the credential information. The electronic device may store the credential information, in response to the electronic key. The electronic device may map the credential information to the key information, based on electronic key identification information. In operation 1427, the electronic device may set the electronic key in the active status. The electronic device may change the electronic key status information to the active status in the key information. The electronic device may set the electronic key in the active status, and then return to FIG. 7.

Figure 12:
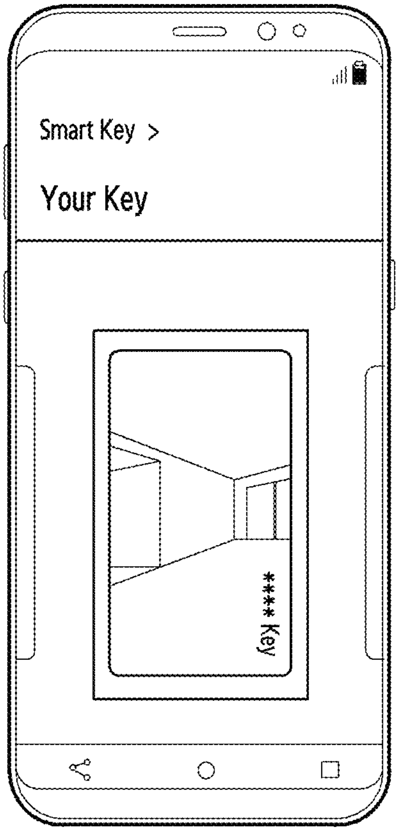

In operation 723, the electronic device may display the electronic key in the active status. If the electronic key status information is changed to the active status in the key information, the electronic device may display the electronic key in the active status. The electronic device may display a GUI associated with the electronic key and indicate the electronic key of the active status in the GUI as shown in FIG. 12. For example, the electronic device may dim the electronic key with the setting of the display device. The electronic device may display at least part of the key information associated with the electronic key in the GUI.

In operation 725, the electronic device may use the credential information. The electronic device may control the door lock by transmitting the credential information to the door lock. For example, using the credential information at the electronic device shall be explained in FIG. 15A and FIG. 15B.

Figure 15A:
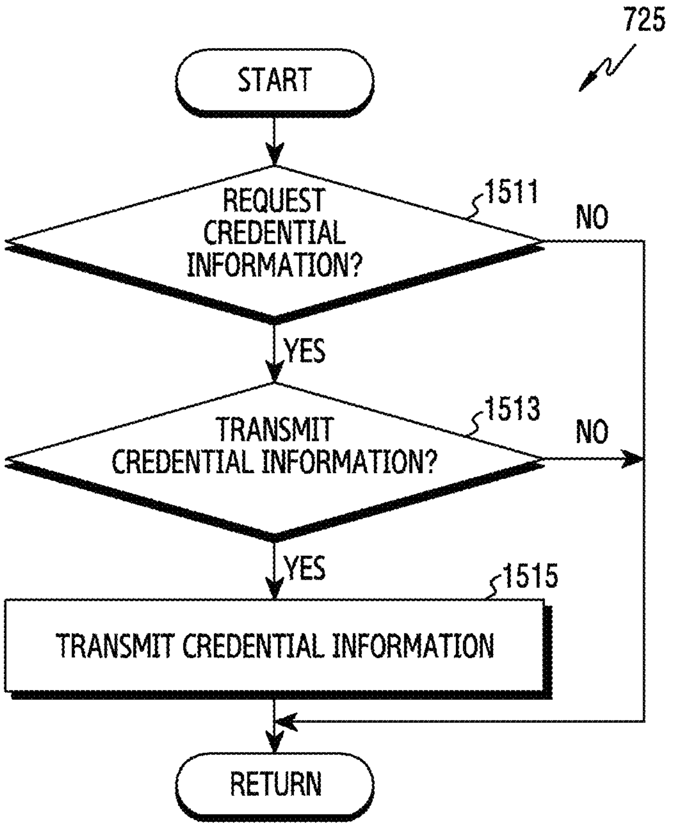
FIG. 15A and FIG. 15B illustrate a flowchart of using credential information of FIG. 7.

FIG. 15A illustrates a flowchart of an example of using credential information of FIG. 7. For example, the communication scheme between the electronic device and the door lock may adopt NFC.

Referring to FIG. 15A, the electronic device may receive a credential information request from the door lock in operation 1511. For example, if the electronic device is tagged to the door lock, the door lock may request the credential information from the electronic device. In so doing, the door lock may transmit door lock identification information of the electronic device. In operation 1513, the electronic device may determine whether to transmit the credential information to the door lock. The electronic device may determine whether the electronic key corresponds to the door lock, by comparing the key information with the door lock identification information. If the electronic key corresponds to the door lock, the electronic device may determine to transmit the credential information. If determining to transmit the credential information in operation 1513, the electronic device may transmit the credential information to the door lock in operation 1515. If the credential information is received from the electronic device, the door lock may be controlled based on the credential information. For example, the door lock may be controlled to open or close a door and may be initialized. After transmitting the credential information, the electronic device may return to FIG. 7.

If the credential information is not requested from the door lock in operation 1511 or if the credential information is not transmitted in operation 1513, the electronic device may return to FIG. 7. The electronic device may return to FIG. 7, without transmitting the credential information to the door lock.

Figure 15B:
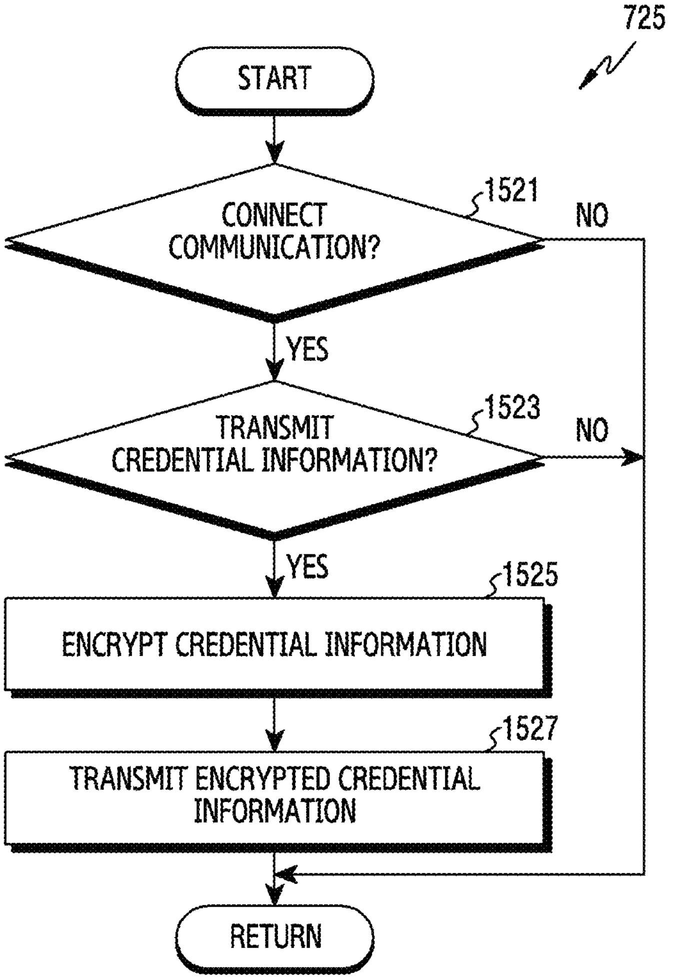

FIG. 15B illustrates a flowchart of another example of using credential information of FIG. 7. For example, the communication scheme between the electronic device and the door lock may adopt BLE.

Referring to FIG. 15B, the electronic device may detect communication connection with the door lock in operation 1521. The electronic device may determine whether to transmit the credential information to the door lock in operation 1523. The electronic device may determine whether the electronic key corresponds to the door lock, by comparing the key information with the door lock identification information. If the electronic key corresponds to the door lock, the electronic device may determine to transmit the credential information. If determining to transmit the credential information in operation 1523, the electronic device may encrypt the credential information in operation 1525. The electronic device may encrypt the credential information, based on a preset algorithm corresponding to the door lock. The electronic device may transmit the encrypted credential information to the door lock in operation 1527. If receiving the encrypted credential information from the electronic device, the door lock may decrypt the encrypted credential information, based on the preset algorithm. Thus, the door lock may be controlled based on the credential information. For example, the door lock may be controlled to open or close the door and may be initialized. After transmitting the credential information, the electronic device may return to FIG. 7.

Figure 16:
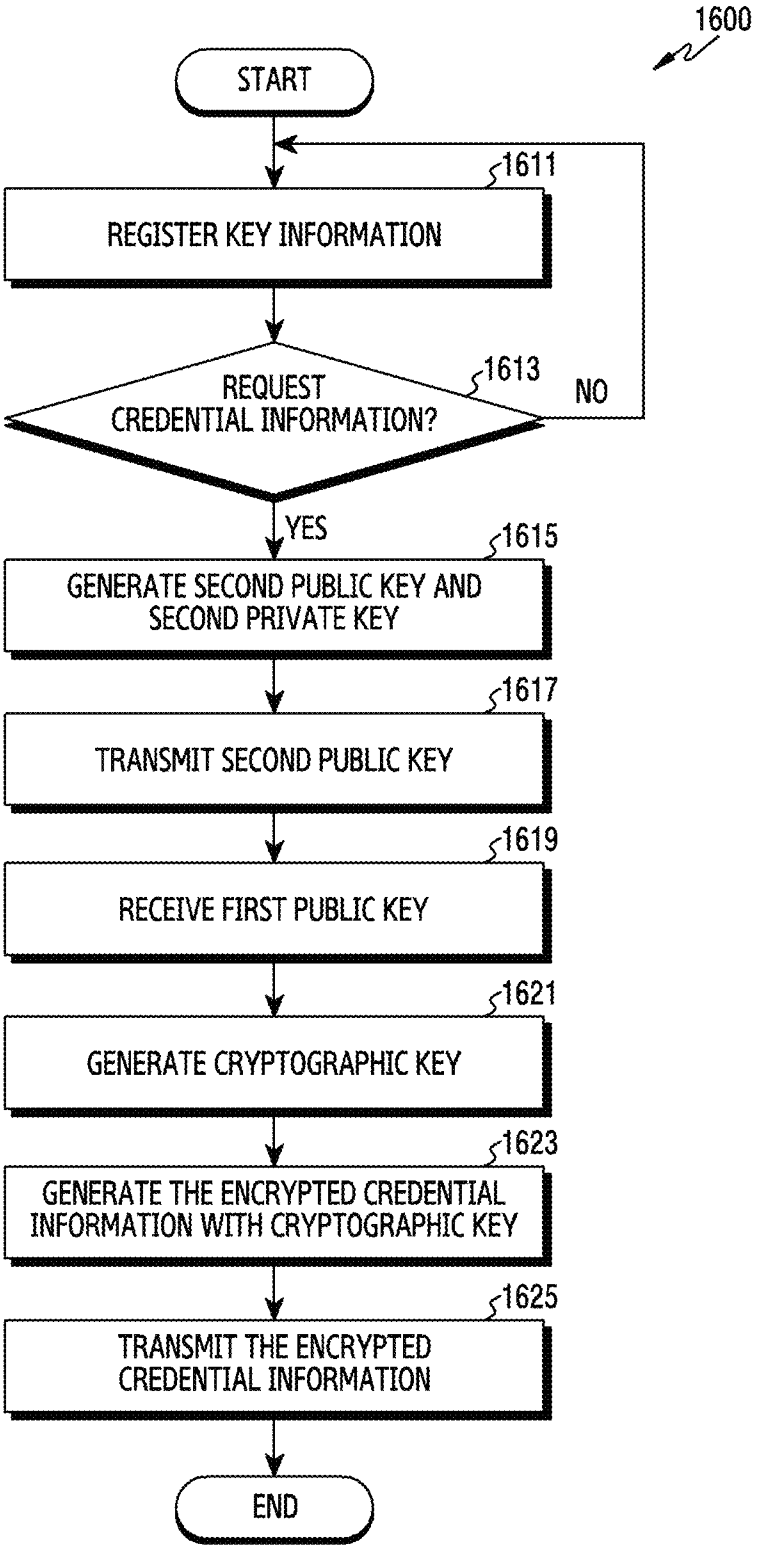
FIG. 16 illustrates a flowchart of an operating method of an external electronic device according to various embodiments.

FIG. 16 illustrates a flowchart of an operating method 1600 of an external electronic device (e.g., the second electronic device 509, 609) according to various embodiments.

Referring to FIG. 16, the external electronic device may register key information associated with an electronic key in operation 1611. The external electronic device may store the key information, in response to the electronic key. The key information may include at least one of electronic key identification information, electronic device identification information, identification information of a door lock (e.g., the door lock 306), an electronic key communication scheme, an electronic key name, an electronic key identifier per provider, time data of the electronic key, location data of the electronic key, or status information of the electronic key. The electronic key communication scheme is a communication scheme between the electronic device (e.g., the electronic device 401, the first electronic device 501, the first electronic device 601) for using the electronic key and the door lock, and may be determined to at least one of, for example, WiFi, BT/BLE, UWB, NFC, or MST. The electronic device may set electronic key status information as the inactive status in the key information.

In operation 1613, the external electronic device may receive a credential information request regarding the electronic key. The external electronic device may receive the credential information request from the electronic device. The external electronic device may receive the credential information request directly from the electronic device. Alternatively, the external electronic device may receive the credential information request from the electronic device via an external device.

In operation 1615, the external electronic device may generate a second public key and a second private key. The external electronic device may generate the second public key and the second private key, based on a preset algorithm. The external electronic device may generate the second public key and the second private key, based on the key information. The external electronic device may transmit the second public key in operation 1617. The external electronic device may transmit the second public key to the external device. The external electronic device may receive a first public key in operation 1619. The external electronic device may receive the first public key from the external device. The external electronic device may generate a cryptographic key in operation 1621. The external electronic device may generate the cryptographic key, based on the first public key, the second public key, and the second private key.

In operation 1623, the external electronic device may generate encrypted credential information, based on the cryptographic key. The external electronic device may generate the credential information associated with the electronic key and encrypt the credential information with the cryptographic key. In operation 1625, the external electronic device may transmit the encrypted credential information. The external electronic device may transmit the encrypted credential information to the external device.

Figure 17:
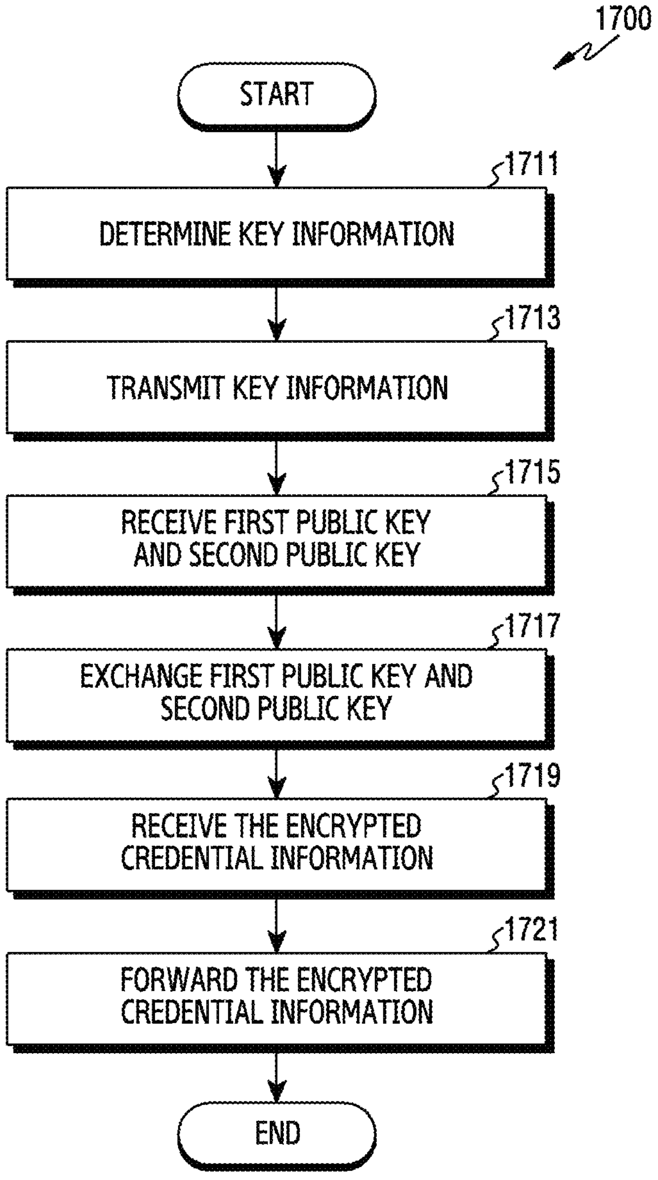
FIG. 17 illustrates a flowchart of an operating method of an external device according to various embodiments.

FIG. 17 illustrates a flowchart of an operating method 1700 of an external device (e.g., the external device 408, the server 508, the server 608) according to various embodiments.

Referring to FIG. 17, the external device may determine key information associated with an electronic key in operation 1711. The external device may transmit the key information in operation 1713. The external device may transmit the key information to an electronic device (e.g., the electronic device 401, the first electronic device 501, the first electronic device 601). The external device may transmit the key information, based on electronic device identification information of the key information. In operation 1715, the external device may receive a first public key and a second public key. The external device may receive the first public key from the electronic device and receive the second public key from an external electronic device (e.g., the second electronic device 509, the second electronic device 609). In operation 1717, the external device may exchange the first public key and the second public key. The external device may transmit the second public key to the electronic device and transmit the first public key to the external electronic device. In operation 1719, the external device may receive encrypted credential information associated with the electronic key. The external device may receive the encrypted credential information from the external electronic device. In operation 1721, the external device may forward the encrypted credential information. The external device may forward the encrypted credential information to the electronic device.

According to an embodiment, as displaying the electronic key in operation 717 or operation 723, the electronic device may display another electronic key, based on a gesture input received through the touch screen display. The electronic device may include a plurality of electronic keys, for example, a first electronic key and a second electronic key. The electronic device may display a first GUI associated with the first electronic key. The first GUI may indicate the first electronic key in the inactive status or the active state. As displaying the first GUI, the electronic device may display a second GUI associated with the second electronic key, based at least in part on a gesture input. The second GUI may indicate the second electronic key in the inactive status or the active state. For doing so, the electronic device may provide a scrolling effect which changes the first GUI displaying to the second GUI displaying. As displaying the second GUI, the electronic device may display the first GUI, based at least in part on a gesture input. For doing so, the electronic device may provide a scrolling effect which switches the second GUI displaying to the first GUI displaying.

Figure 18:
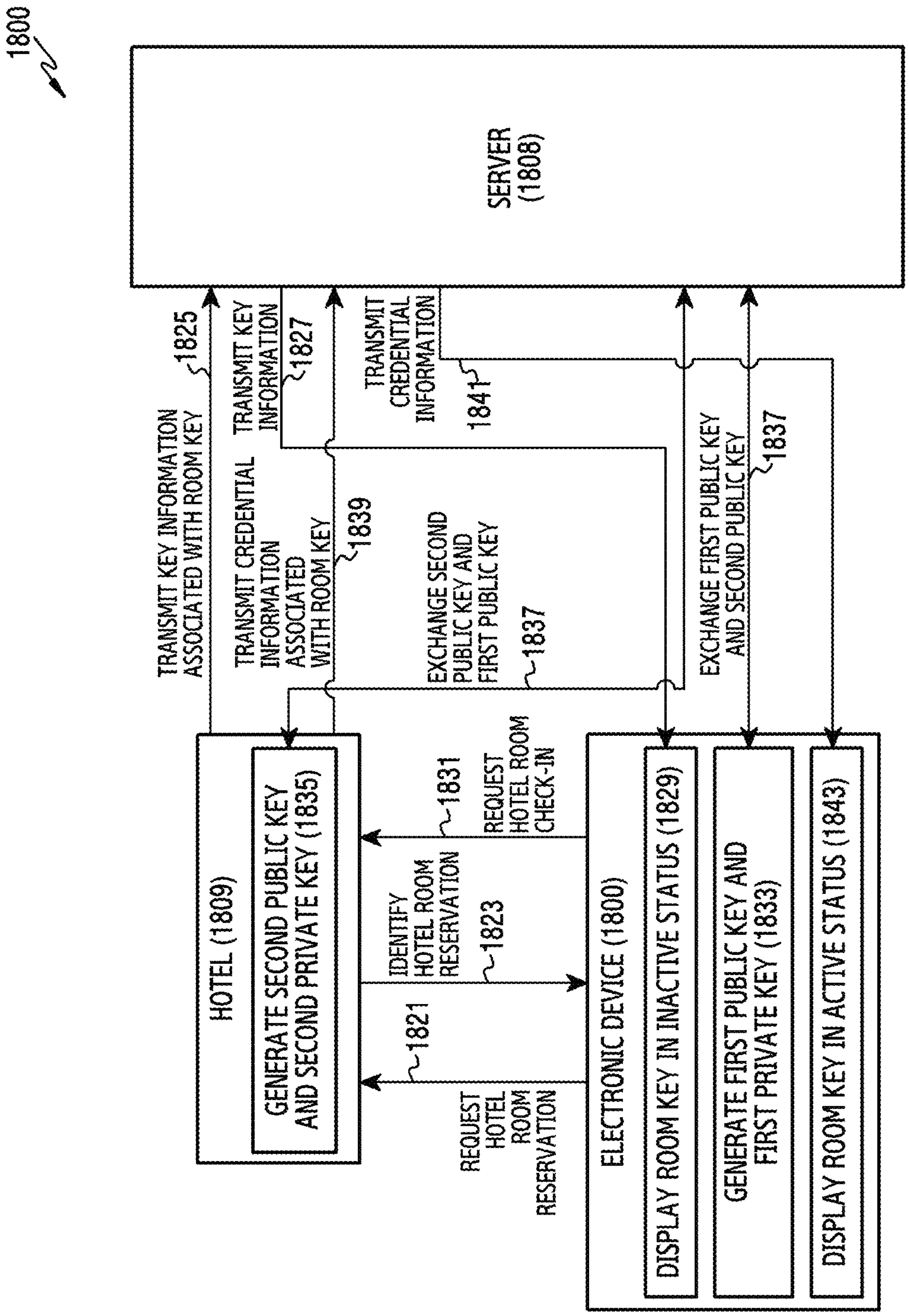
FIG. 18, FIG. 19, and FIG. 20 illustrate diagrams of a network environment according to various embodiments.

FIG. 18 illustrates an example of a network environment 1800 (e.g., the network environment 100).

Referring to FIG. 18, an electronic device 1800 (e.g., the electronic device 401, the first electronic device 501, the first electronic device 601), a server 1808 (e.g., the external device 408, the server 508, the server 608), and a hotel 1809 (e.g., the second electronic device 509, the second electronic device 609) may communicate with each other in the network environment 1800. The hotel 1809 may manage at least one hotel room.

The electronic device 1800 may request hotel room reservation from the hotel 1809 in operation 1821. The electronic device 1800 may request the hotel room reservation, based on an intended check-in date, a check-out date, a hotel room type, and so on. The hotel 1809 may identify the hotel room reservation in response to the electronic device in operation 1823. The hotel 1809 may assign a hotel room to the electronic device 1800, based on the intended check-in date, the check-out date, the hotel room type, and so on. The hotel 1809 may transmit key information associated with the reserved hotel room key to the server 1808 in operation 1825, and the server 1808 may transmit the key information to the electronic device 1800 in operation 1827. The electronic device 1800 may display the room key in the inactive status in operation 1829.

In operation 1831, the electronic device 1800 may request to check in at the reserved hotel room of the hotel 1809. The electronic device 1800 may generate a first public key and a first private key in operation 1833 and the hotel 1809 generate a second public key and a second private key in operation 1835. If the electronic device 1800 requests to check in at the reserved hotel room on the check-in date, the hotel 1809 may generate the second public key and the second private key. The server 1808 may exchange the first public key and the second public key of the electronic device 1800 and the hotel 1809 in operation 1837. The electronic device 1800 may transmit the first public key to the server 1808, and the hotel 1809 may transmit the second public key to the server 1808. The server 1808 may transmit the second public key to the electronic device 1800 and transmit the first public key to the hotel 1809. The hotel 1809 may transmit credential information associated with the reserved room key to the server 1808 in operation 1839, and the server 1808 may transmit the credential information to the electronic device 1800 in operation 1841. The hotel 1809 may encrypt the credential information based on the first public key, the second public key, and the second private key, and transmit the encrypted credential information. The electronic device 1800 may display the room key in the active status in operation 1843. The electronic device 1800 may receive the encrypted credential information and decrypt the encrypted credential information based on the first public key, the second public key, and the first private key.

Figure 19:
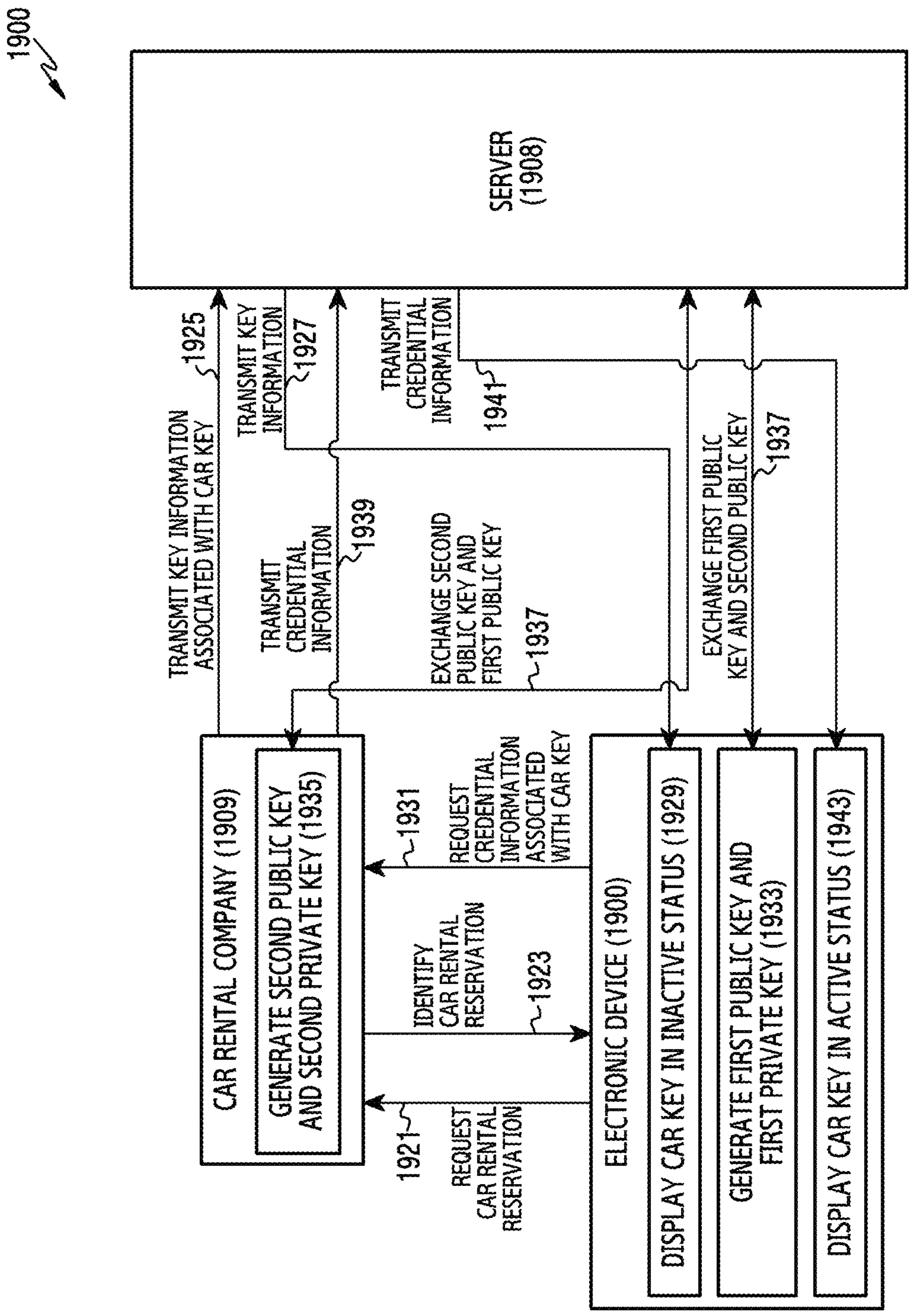

FIG. 19 illustrates another example of a network environment 1900 (e.g., the network environment 100).

Referring to FIG. 19, an electronic device 1900 (e.g., the electronic device 401, the first electronic device 501, the first electronic device 601), a server 1908 (e.g., the external device 408, the server 508, the server 608), and a car rental company 1909 (e.g., the second electronic device 509, the second electronic device 609) may communicate with each other in the network environment 1900. The car rental company 1909 may manage at least one rental car.

The electronic device 1900 may request car rental reservation from the car rental company 1909 in operation 1921. The electronic device 1900 may request the car rental reservation, based on an intended pick-up date, a drop-off date, a car type, and so on. The car rental company 1909 may identify the car rental reservation in response to the electronic device in operation 1923. The car rental company 1909 may assign a rental car to the electronic device 1900, based on the intended pick-up date, the drop-off date, the car type, and so on. The car rental company 1909 may transmit key information associated with the reserved rental car key to the server 1908 in operation 1925, and the server 1908 may transmit the key information to the electronic device 1900 in operation 1927. The electronic device 1900 may display the car key in the inactive status in operation 1929.

In operation 1931, the electronic device 1900 may request credential information associated with the reserved car key from the car rental company 1909. The electronic device 1900 may generate a first public key and a first private key in operation 1933 and the car rental company 1909 may generate a second public key and a second private key in operation 1935. If the electronic device 1900 requests the credential information on the pick-up date of the reserved rental car, the car rental company 1909 may generate the second public key and the second private key. The server 1908 may exchange the first public key and the second public key of the electronic device 1900 and the car rental company 1909 in operation 1937. The electronic device 1900 may transmit the first public key to the server 1908, and the car rental company 1909 may transmit the second public key to the server 1908. The server 1908 may transmit the second public key to the electronic device 1900 and transmit the first public key to the car rental company 1909. The car rental company 1909 may transmit the credential information associated with the reserved car key to the server 1908 in operation 1939, and the server 1908 may transmit the credential information to the electronic device 1900 in operation 1941. The car rental company 1909 may encrypt the credential information based on the first public key, the second public key, and the second private key, and transmit the encrypted credential information. The electronic device 1900 may display the car key in the active status in operation 1943. The electronic device 1900 may receive the encrypted credential information and decrypt the encrypted credential information based on the first public key, the second public key, and the first private key.

Figure 20:
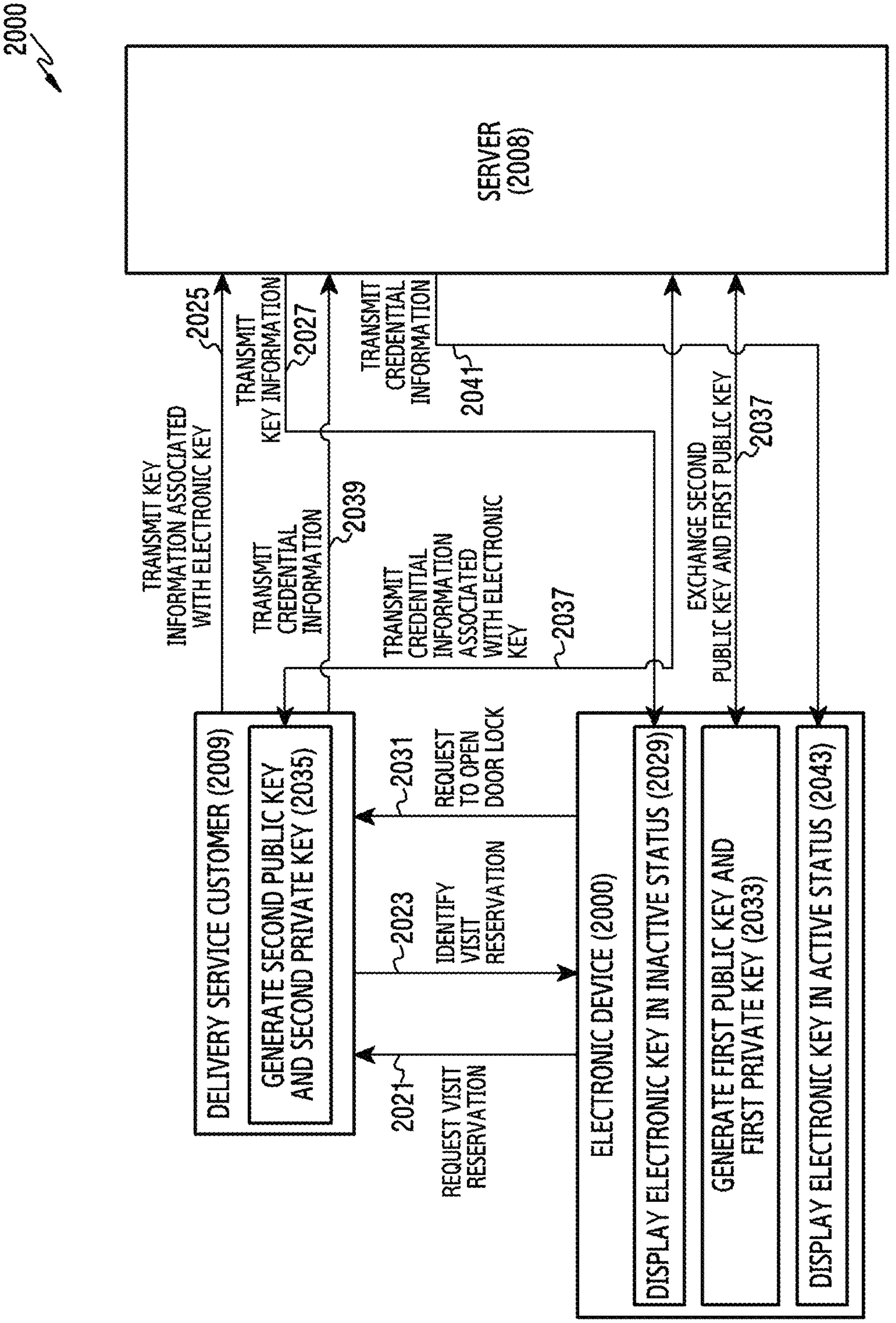

FIG. 20 illustrates yet another example of a network environment 2000 (e.g., the network environment 100).

Referring to FIG. 20, an electronic device 2000 (e.g., the electronic device 401, the first electronic device 501, the first electronic device 601), a server 2008 (e.g., the external device 408, the server 508, the server 608), and a delivery service customer 2009 (e.g., the second electronic device 509, the second electronic device 609) may communicate with each other in the network environment 2000. The delivery service customer 2009 may request to pick up and deliver a package from a delivery service company in advance. The delivery service customer 2009 may request to pick up and deliver the package, based on an intended pick-up date, a delivery date, an address of package storage, a package type, and so on.

The electronic device 2000 may request a visit reservation for picking up the package from the delivery service customer 2009 in operation 2021. The electronic device 2000 may identify the visit reservation in response to the electronic device in operation 2023. The delivery service customer 2009 may transmit key information associated with an electronic key of the reserved package storage to the server 2008 in operation 2025, and the server 2008 may transmit the key information to the electronic device 2000 in operation 2027. The electronic device 2000 may display the electronic key in the inactive status in operation 2029.

In operation 2031, the electronic device 2000 may request the delivery service customer 2009 to open a door lock of the reserved package storage. The electronic device 2000 may generate a first public key and a first private key in operation 2033 and the delivery service customer 2009 may generate a second public key and a second private key in operation 2035. If the electronic device 2000 requests to open the door lock of the reserved package storage on the package pick-up date, the delivery service customer 2009 may generate the second public key and the second private key. The server 2008 may exchange the first public key and the second public key of the electronic device 2000 and the delivery service customer 2009 in operation 2037. The electronic device 2000 may transmit the first public key to the server 2008, and the delivery service customer 2009 may transmit the second public key to the server 2008. The server 2008 may transmit the second public key to the electronic device 2000 and transmit the first public key to the delivery service customer 2009. The delivery service customer 2009 may transmit credential information associated with the reserved electronic key to the server 2008 in operation 2039, and the server 2008 may transmit credential information to the electronic device 2000 in operation 2041. The delivery service customer 2009 may encrypt the credential information based on the first public key, the second public key, and the second private key, and transmit the encrypted credential information. The electronic device 2000 may display the electronic key in the active status in operation 2043. The electronic device 2000 may receive the encrypted credential information and decrypt the encrypted credential information based on the first public key, the second public key, and the first private key.

According to various embodiments, a method for operating an electronic device (e.g., the electronic device 401, the electronic device 501, the first electronic device 601) may include receiving first information associated with a first electronic key of a first door lock, displaying a first GUI associated with the first electronic key to indicate an inactive status of the first electronic key on the display, receiving first credential information associated with the first electronic key, and after receiving the first credential information, changing the first GUI to indicate an active status of the first electronic key.

According to various embodiments, the method may further include receiving second information associated with a second electronic key of a second door lock and displaying a second GUI associated with the second electronic key, to indicate an inactive status of the second electronic key on the display.

According to various embodiments, the method may further include receiving a gesture input via the display, and providing a scrolling effect to change from displaying the first GUI to displaying the second GUI, based at least in part on the gesture input.

According to various embodiments, the method may further include receiving a gesture input via the display and providing a scrolling effect to change from displaying the second GUI to displaying the first GUI, based at least in part on the gesture input.

According to various embodiments, the method may further include receiving second credential information associated with the second electronic key, and after receiving the second credential information, changing the second GUI to indicate an active status of the second electronic key.

According to various embodiments, displaying the first GUI may include displaying at least part of the first information through the first GUI.

According to various embodiments, the first information may include at least one of location information of the first door lock or time data indicating a validity period of the first electronic device.

According to various embodiments, displaying the first GUI may include displaying the first GUI to indicate the inactive status of the first electronic device, based on at least one of the location data or the time data.

According to various embodiments, the method may further include displaying the first GUI to indicate the active status of the first electronic device, based on at least one of the location data or the time data.

According to various embodiments, a non-transitory computer-readable storage medium may store one or more programs to receive first information associated with a first electronic key of a first door lock, to display a first GUI associated with the first electronic key to indicate an inactive status of the first electronic key, to receive first credential information associated with the first electronic key, and after receiving the first credential information, to change the first GUI to indicate an active status of the first electronic key.

According to various embodiments, the programs may further receive second information associated with a second electronic key of a second door lock, display a second GUI associated with the second electronic key to indicate an inactive status of the second electronic key, receive second credential information associated with the second electronic key, and after receiving the second credential information, change the second GUI to indicate an active status of the second electronic key.

According to various embodiments, the programs may further receive a gesture input, and provide a scrolling effect to change from displaying the first GUI to displaying the second GUI, based at least in part on the gesture input, or provide a scrolling effect to change from displaying the second GUI to displaying the first GUI, based at least in part on the gesture input.

The electronic device in various embodiments may enhance security for the electronic key. That is, as the electronic device receives the information associated with the electronic key, the user may obtain the presence of the electronic key. Further, by receiving the credential information associated with the electronic key, the electronic device may control the door lock using the electronic device. To use the electronic key, the electronic device needs to receive both of the key information and the credential information. As a result, an external electronic device may have difficulty in receiving the electronic key, and it may be difficult to access an external electronic device and acquire the electronic key.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:

a touch screen display;

a wireless communication circuit;

at least one processor operatively connected to the touch screen display and the wireless communication circuit; and a memory operatively connected to the processor, wherein the memory stores instructions which, when executed, cause the processor to:

receive first information associated with a first electronic key of a first door lock via the wireless communication circuit, determine whether to display a first electronic key, in a first graphic user interface (GUI) associated with the first electronic key, based on at least one of location data or time data in the first information, in response to a determination to display the first electronic key, determine whether first credential information associated with the first electronic key is pre-stored on the electronic device, wherein the first credential information is different from the first information and indicates a private value assigned to the first electronic key for a door lock control credential, in response to a determination that the first credential information is not pre-stored on the electronic device, display the first electronic key in the first GUI providing a visual effect of displaying the first electronic key dimmer than a setting of the display to indicate an inactive status of the first electronic key on the display, determine whether to activate the first electronic key, in response to a determination to activate the first electronic key, receive the first credential information associated with the first electronic key via the wireless communication circuit, store the first credential information, and after storing the first credential information, change the display of the first electronic key in the first GUI to indicate an active status of the first electronic key, providing a visual effect of displaying the first electronic key with a dimness that matches the setting of the display.

2. The electronic device of claim 1, wherein the instructions cause the processor to:

receive second information associated with a second electronic key of a second door lock via the wireless communication circuit, and display a second GUI associated with the second electronic key, to indicate an inactive status of the second electronic key on the display.

3. The electronic device of claim 2, wherein the instructions cause the processor to:

receive a gesture input via the display, and provide a scrolling effect to change from displaying the first GUI to displaying the second GUI or vice versa, based at least in part on the gesture input.

4. The electronic device of claim 2, wherein the instructions cause the processor to:

receive second credential information associated with the second electronic key via the wireless communication circuit, and after receiving the second credential information, change the second GUI to indicate an active status of the second electronic key.

5. The electronic device of claim 1, wherein the instructions cause the processor to display at least part of the first information through the first GUI.

6. The electronic device of claim 1, wherein the first information comprises at least one of location data of the first door lock or time data indicating a validity period of the electronic device, and the instructions cause the processor to display the first GUI to indicate any one of the inactive status or the active status of the electronic device, based on at least one of the location data or the time data.

7. The electronic device of claim 6, wherein the instructions cause the processor to:

receive a gesture input through the display, and display the first GUI or a third GUI associated with an electronic card, based on at least one of the location data or the time data.

8. The electronic device of claim 6, wherein the instructions cause the processor to:

display a button corresponding to the first electronic key on the display, based on at least one of the location data or the time data, detect selection of the button, and display the first GUI to indicate any one of the inactive status or the active status of the electronic device.

9. The electronic device of claim 6, wherein the instructions cause the processor to:

display a notification corresponding to the first electronic key on the display, based on at least one of the location data or the time data, detect selection of the notification, and display the first GUI to indicate any one of the inactive status or the active status of the electronic device.

10. The electronic device of claim 6, wherein the instructions cause the processor to request the first credential information, based on at least one of a user request, the location data, or the time data.

11. A method for operating an electronic device which comprises a touch screen display, the method comprising:

receiving first information associated with a first electronic key of a first door lock;

determining whether to display the first electronic key, in a first graphic user interface (GUI) associated with the first electronic key, based on at least one of location data or time data in the first information;

in response to a determination to display the first electronic key, determining whether first credential information associated with the first electronic key is pre-stored on the electronic device, wherein the first credential information is different from the first information and indicates a private value assigned to the first electronic key for a door lock control credential;

in response to a determination that the first credential information is not pre-stored on the electronic device, displaying the first electronic key in the first GUI providing a visual effect of displaying the first electronic key dimmer than a setting of the display to indicate an inactive status of the first electronic key on the display;

determining whether to activate the first electronic key;

in response to a determination to activate the first electronic key, receiving the first credential information associated with the first electronic key;

storing the first credential information; and after storing the first credential information, changing the display of the first electronic key in the first GUI to indicate an active status of the first electronic key, providing a visual effect of displaying the first electronic key with a dimness that matches the setting of the display.

12. The method of claim 11, further comprising:

receiving second information associated with a second electronic key of a second door lock; and displaying a second GUI associated with the second electronic key, to indicate an inactive status of the second electronic key on the display.

13. The method of claim 12, further comprising:

receiving a gesture input via the touch screen display; and providing a scrolling effect to change from displaying the first GUI to displaying the second GUI, based at least in part on the gesture input, or providing a scrolling effect to change from displaying the second GUI to displaying the first GUI, based at least in part on the gesture input.

14. The method of claim 12, further comprising:

receiving second credential information associated with the second electronic key; and after receiving the second credential information, changing the second GUI to indicate an active status of the second electronic key.

15. The method of claim 11, wherein displaying the first GUI comprises:

displaying at least part of the first information through the first GUI.

16. The method of claim 11, wherein the first information comprises at least one of location data of the first door lock or time data indicating a validity period of the electronic device, and displaying the first GUI comprises:

displaying the first GUI to indicate the inactive status of the electronic device, based on at least one of the location data or the time data.

17. The method of claim 11, wherein the first information comprises at least one of location data of the first door lock or time data indicating a validity period of the electronic device, and further comprising:

displaying the first GUI to indicate the active status of the electronic device, based on at least one of the location data or the time data.

18. A non-transitory computer-readable medium including a plurality of instructions that, when executed by a processor, are configured to:

receive first information associated with a first electronic key of a first door lock, determine whether to display the first electronic key, in a first graphic user interface (GUI) associated with the first electronic key, based on at least one of location data or time data in the first information, in response to a determination to display the first electronic key, determine whether first credential information associated with the first electronic key is pre-stored on an electronic device, wherein the first credential information is different from the first information and indicates a private value assigned to the first electronic key for a door lock control credential, in response to a determination that the first credential information is not pre-stored on the electronic device, display the first electronic key in the first GUI providing a visual effect of displaying the first electronic key dimmer than a setting of the display to indicate an inactive status of the first electronic key, determine whether to activate the first electronic key, in response to a determination to activate the first electronic key, receive the first credential information associated with the first electronic key, store the first credential information, and after storing the first credential information, change the display of the first electronic key in the first GUI to indicate an active status of the first electronic key, providing a visual effect of displaying the first electronic key with a dimness that matches the setting of the display.

19. The non-transitory computer-readable medium of claim 18, wherein the plurality of instructions is further configured to cause the processor to:

receive second information associated with a second electronic key of a second door lock, display a second GUI associated with the second electronic key to indicate an inactive status of the second electronic key, receive second credential information associated with the second electronic key, and after receiving the second credential information, change the second GUI to indicate an active status of the second electronic key.

20. The non-transitory computer-readable medium of claim 19, wherein the plurality of instructions is further configured to cause the processor to:

receive a gesture input, and provide a scrolling effect to change from displaying the first GUI to displaying the second GUI, based at least in part on the gesture input, or provide a scrolling effect to change from displaying the second GUI to displaying the first GUI, based at least in part on the gesture input.

* * * * *